United States Patent
Cook et al.

(10) Patent No.: US 10,356,225 B2
(45) Date of Patent: *Jul. 16, 2019

(54) SYSTEM AND METHOD FOR IMPLEMENTING ISOLATED SERVICE OVERLAYS BETWEEN PROVIDER NETWORK SERVICE POINT AND CUSTOMER PREMISES

(71) Applicant: CenturyLink Intellectual Property LLC, Denver, CO (US)

(72) Inventors: Charles I. Cook, Louisville, CO (US); Michael K. Bugenhagen, Leawood, KS (US); Kevin M. McBride, Lone Tree, CO (US); Andrew V. Cook, Sheldon, IA (US); Michael J. Fargano, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/148,711

(22) Filed: May 6, 2016

(65) Prior Publication Data

US 2016/0330074 A1  Nov. 10, 2016

Related U.S. Application Data

(60) Provisional application No. 62/172,359, filed on Jun. 8, 2015, provisional application No. 62/159,788, filed
(Continued)

(51) Int. Cl.
*H04B 10/27* (2013.01)
*H04L 12/28* (2006.01)
(Continued)

(52) U.S. Cl.
CPC ............ *H04L 69/16* (2013.01); *H04B 10/27* (2013.01); *H04L 12/28* (2013.01);
(Continued)

(58) Field of Classification Search
None
See application file for complete search history.

(56) References Cited

U.S. PATENT DOCUMENTS

| 6,577,327 B1 | 6/2003 | Rochford et al. |
| 8,051,382 B1 | 11/2011 | Kingdom et al. |

(Continued)

FOREIGN PATENT DOCUMENTS

WO   WO-2017-146768 A1   8/2017

OTHER PUBLICATIONS

International Search Report and Written Opinion prepared by the Korean Intellectual Property Office as International Searching Authority for PCT Intl Patent App. No. PCT/US2016/044867 13 pages.
(Continued)

*Primary Examiner* — Sargon N Nano
*Assistant Examiner* — Christopher B Robinson

(57) ABSTRACT

Novel tools and techniques might provide for implementing extension of customer local area networks ("LANs") and/or implementing isolated service overlays over a network. In some embodiments, a network service point that is located external to a demarcation point at each of a plurality of customer premises might establish a connection between a service provider network and a customer LAN, which has already been established within a customer premises. The system subsequently extends the customer LAN, via this connection, to span between the network service point and the customer premises. Alternatively, or additionally, the system might establish two or more isolated service overlays across the customer LAN between the network service point
(Continued)

and the customer premises, each of the two or more isolated service overlays having network traffic that is isolated from network traffic transmitted along another of the two or more isolated service overlays.

24 Claims, 17 Drawing Sheets

Related U.S. Application Data on May 11, 2015, provisional application No. 62/157,795, filed on May 6, 2015.

(51) Int. Cl.

| | | |
|---|---|---|
| *H04L 29/06* | (2006.01) | |
| *H04L 29/08* | (2006.01) | |
| *H04L 12/715* | (2013.01) | |
| *H04L 12/947* | (2013.01) | |
| *H04W 84/12* | (2009.01) | |
| *H04W 88/12* | (2009.01) | |
| *H04L 12/46* | (2006.01) | |

(52) U.S. Cl.
CPC .......... *H04L 12/2878* (2013.01); *H04L 45/64* (2013.01); *H04L 49/25* (2013.01); *H04L 67/02* (2013.01); *H04L 67/10* (2013.01); *H04L 67/12* (2013.01); *H04L 2012/4629* (2013.01); *H04W 84/12* (2013.01); *H04W 88/12* (2013.01)

(56) References Cited

U.S. PATENT DOCUMENTS

| | | | |
|---|---|---|---|
| 9,733,975 B2 | 8/2017 | Cook et al. | |
| 2006/0184998 A1 | 8/2006 | Smith | |
| 2006/0224669 A1* | 10/2006 | Wouhaybi | H04L 41/5054 709/204 |
| 2006/0236095 A1 | 10/2006 | Smith | |
| 2007/0014306 A1* | 1/2007 | Tirri | H04L 12/2892 370/463 |
| 2007/0115962 A1* | 5/2007 | Mammoliti | H04L 41/0806 370/389 |
| 2007/0124406 A1 | 5/2007 | Liu | |
| 2008/0025321 A1* | 1/2008 | Gudipudi | H04W 16/00 370/395.53 |
| 2008/0043640 A1 | 2/2008 | Smith | |
| 2008/0155423 A1 | 6/2008 | Moran | |
| 2009/0290595 A1 | 11/2009 | Celebioglu | |
| 2010/0080238 A1 | 4/2010 | Allan | |
| 2010/0149999 A1 | 6/2010 | Beattie | |
| 2010/0169780 A1 | 7/2010 | Bryant-Rich | |
| 2010/0177642 A1 | 7/2010 | Sebastian | |
| 2011/0317678 A1 | 12/2011 | Allan et al. | |
| 2012/0072564 A1 | 3/2012 | Johnsen | |
| 2012/0233350 A1 | 9/2012 | Unbehagen | |
| 2013/0061297 A1 | 3/2013 | Larsen et al. | |
| 2013/0204971 A1 | 8/2013 | Brandywine et al. | |
| 2014/0112349 A1* | 4/2014 | Moreno | H04L 45/64 370/400 |
| 2014/0201374 A1 | 7/2014 | Ashwood-Smith | |
| 2014/0317293 A1 | 10/2014 | Shatzkamer | |
| 2014/0321298 A1* | 10/2014 | Chow | H04L 41/083 370/252 |
| 2015/0052600 A1 | 2/2015 | Weinsberg | |
| 2015/0212856 A1 | 7/2015 | Shanmuganathan et al. | |
| 2015/0256357 A1* | 9/2015 | Rajendran | H04L 41/0806 370/392 |
| 2015/0263946 A1 | 9/2015 | Tubaltsev | |
| 2015/0295750 A1 | 10/2015 | Blanco | |
| 2016/0006696 A1 | 1/2016 | Donley et al. | |
| 2016/0044035 A1 | 2/2016 | Huang | |
| 2016/0329965 A1 | 11/2016 | Cook et al. | |
| 2016/0330074 A1 | 11/2016 | Cook et al. | |
| 2016/0330613 A1 | 11/2016 | Cook et al. | |
| 2016/0335111 A1 | 11/2016 | Bruun | |
| 2016/0337206 A1 | 11/2016 | Bugenhagen et al. | |
| 2017/0034763 A1 | 2/2017 | Reddy et al. | |
| 2017/0111221 A1 | 4/2017 | Chouhan | |
| 2017/0308395 A1 | 10/2017 | Cook et al. | |
| 2019/0028573 A1 | 1/2019 | Cook et al. | |

OTHER PUBLICATIONS

U.S. Appl. No. 15/148,721 Ex Parte Quayle Action dated Mar. 13, 2017; 39 pages.
U.S. Appl. No. 15/148,721 Notice of Allowance; 14 pages.
International Preliminary Report on Patentability, PCT-US2016-044867, dated Sep. 7, 2018, 10 pages.

* cited by examiner

SYSTEM AND METHOD FOR IMPLEMENTING ISOLATED SERVICE OVERLAYS BETWEEN PROVIDER NETWORK SERVICE POINT AND CUSTOMER PREMISES

CROSS-REFERENCES TO RELATED APPLICATIONS

This application claims priority to U.S. Patent Application Ser. No. 62/157,795 (the "'795 application"), filed May 6, 2015 by Charles I. Cook et al. and titled, "NFVI Enhanced Open Business/Residential Gateways and Customer Portal," U.S. Patent Application Ser. No. 62/159,788 (the "'788 application"), filed May 11, 2015 by Charles I. Cook et al. and titled, "NFVI Enhanced Open Business/Residential Gateways and Customer Portal," U.S. Patent Application Ser. No. 62/172,359 (the "'359 application"), filed Jun. 8, 2015 by Charles I. Cook et al. and titled, "Enhanced LAN With Customer Portal Control. Control.

This application may be related to U.S. patent application Ser. No. 15/148,688 filed on a date even herewith by Charles I. Cook et al. and titled, "System and Method for Implementing Network Enhanced Gateway Functionality," U.S. patent application Ser. No. 15/148,705, filed on a date even herewith by Charles I. Cook et al. and titled, "System and Method for Implementing Extension of Customer LAN at Provider Network Service Point" now U.S. Pat. No. 10,110,710), and U.S. patent application Ser. No. 15/148,721, filed on a date even herewith by Charles I. Cook et al. and titled, "System and Method for Implementing Network Experience Shifting" now U.S. Pat. No. 9,733,975), each of which claims priority to each of the '795, '788, and '359 applications.

This application may be related to U.S. patent application Ser. No. 14/678,208 (the "'208 application"), filed Apr. 3, 2015 by Michael J. Fargano et al. and titled, "Network Functions Virtualization Interconnection Gateway" now U.S. Pat. No. 9,948,493), which claims priority to U.S. Patent Application Ser. No. 61/974,927, filed Apr. 3, 2014 by Michael J. Fargano and titled, "Network Functions Virtualization Interconnection Gateway;" U.S. patent application Ser. No. 14/678,280 (the "'280 application"), filed on Apr. 3, 2015 by Michael J. Fargano et al. and titled, "Network Functions Virtualization Interconnection Hub," which claims priority to U.S. Patent Application Ser. No. 61/974,930, filed Apr. 3, 2014 by Michael J. Fargano and titled, "Network Functions Virtualization Interconnection Hub;" U.S. patent application Ser. No. 14/678,309 (the "'309 application"), filed Apr. 3, 2015 by Michael J. Fargano et. al and titled, "Customer Environment Network Functions Virtualization (NFV)" now U.S. Pat. No. 9,998,320), which claims priority to U.S. Patent Application Ser. No. 61/976,896, filed Apr. 8, 2014 by Michael J. Fargano and titled, "Customer Environment Network Functions Virtualization (NFV)" and U.S. Patent Application Ser. No. 61/977,820, filed Apr. 10, 2014 by Michael J. Fargano and titled, "Customer Environment Network Functions Virtualization (NFV);" U.S. patent application Ser. No. 14/730,695 (the "'695 application"), filed Jun. 4, 2015 by Charles I. Cook et al. and titled, "Remoting Application Servers" now U.S. Pat. No. 10,225,327), which claims priority to U.S. Patent Application Ser. No. 62/037,096, filed Aug. 13, 2014 by Charles I. Cook et al. and titled, "Remoting Application Servers;" and U.S. patent application Ser. No. 14/983,884 (the "'884 application"), filed Dec. 30, 2015 by Kevin M. McBride et al. and titled, "Intent-Based Services Orchestration" now U.S. Pat. No. 9,882,833), which claims priority to U.S. Patent Application Ser. No. 62/233,911, filed Sep. 28, 2015 by Kevin M. McBride et al. and titled, "Intent-Based Services Orchestration" and U.S. Patent Application Ser. No. 62/247,294, filed Oct. 28, 2015 by Kevin M. McBride et al. and titled, "Intent-Based Services Orchestration;" and U.S. patent application Ser. No. 14/983,758 (the "'758 application"), filed Dec. 30, 2015 by Michael K. Bugenhagen and titled, "Virtual Machine-To-Port Peripheral Device Driver" now U.S. Pat. No. 10,078,528), which claims priority to U.S. Patent Application Ser. No. 62/237,981, filed Oct. 6, 2015 by Michael K. Bugenhagen and titled, "NFV Peripheral Network Driver for VNF's."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing extension of customer local area networks ("LANs") and/or implementing isolated service overlays over a network, and, in particular embodiments, to methods, systems, apparatus, and computer software for implementing extension of customer LANs at a provider network service point(s) and/or implementing isolated service overlays between the provider network service point(s) and each of one or more customer premises.

BACKGROUND

Typically, conventional network access devices—such as conventional residential gateways ("RGs"), conventional business gateways ("BGs"), conventional network interface devices ("NIDs") or conventional enhanced NIDs ("eNIDs"), conventional optical network terminals ("ONTs"), conventional modems, and/or the like—provide both wide area network ("WAN") interface and local area network ("LAN") interface functions at the customer premises. Current standards developing organization ("SDO") activities are focused on splitting the functionality between physical and virtual components of these access devices. What is not addressed, however, is turning these access devices into devices that can host virtual network functions ("VNFs"). To date, VNFs have only been explored as functions hosted in the service provider network.

Traditionally, the conventional NID translates LAN addresses and provides a gateway function to the WAN at the customer premises. This WAN-to-LAN conversion, which is conducted at the customer premises, results in the "Access" being identified as part of the WAN service (for example, "Internet Access"). Traditionally also, "cloud" services have been located at the Internet Core or on the WAN on the upstream side of the Access, and only associated with the customer as a standalone service. With the WAN/LAN interface functionality located at the customer premises, however, there is limited or no isolation between different services or between different types of services being transmitted to the customer premises over the WAN, which may expose the customer and/or any data being transmitted as part of the services to privacy and/or security issues.

Hence, there is a need for more robust and scalable solutions for implementing extension of customer local area networks ("LANs") and/or implementing isolated service overlays over a network, and, in particular embodiments, to methods, systems, apparatus, and computer software for implementing extension of customer LANs at a provider network service point(s) and/or implementing isolated service overlays between the provider network service point(s) and each of one or more customer premises.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
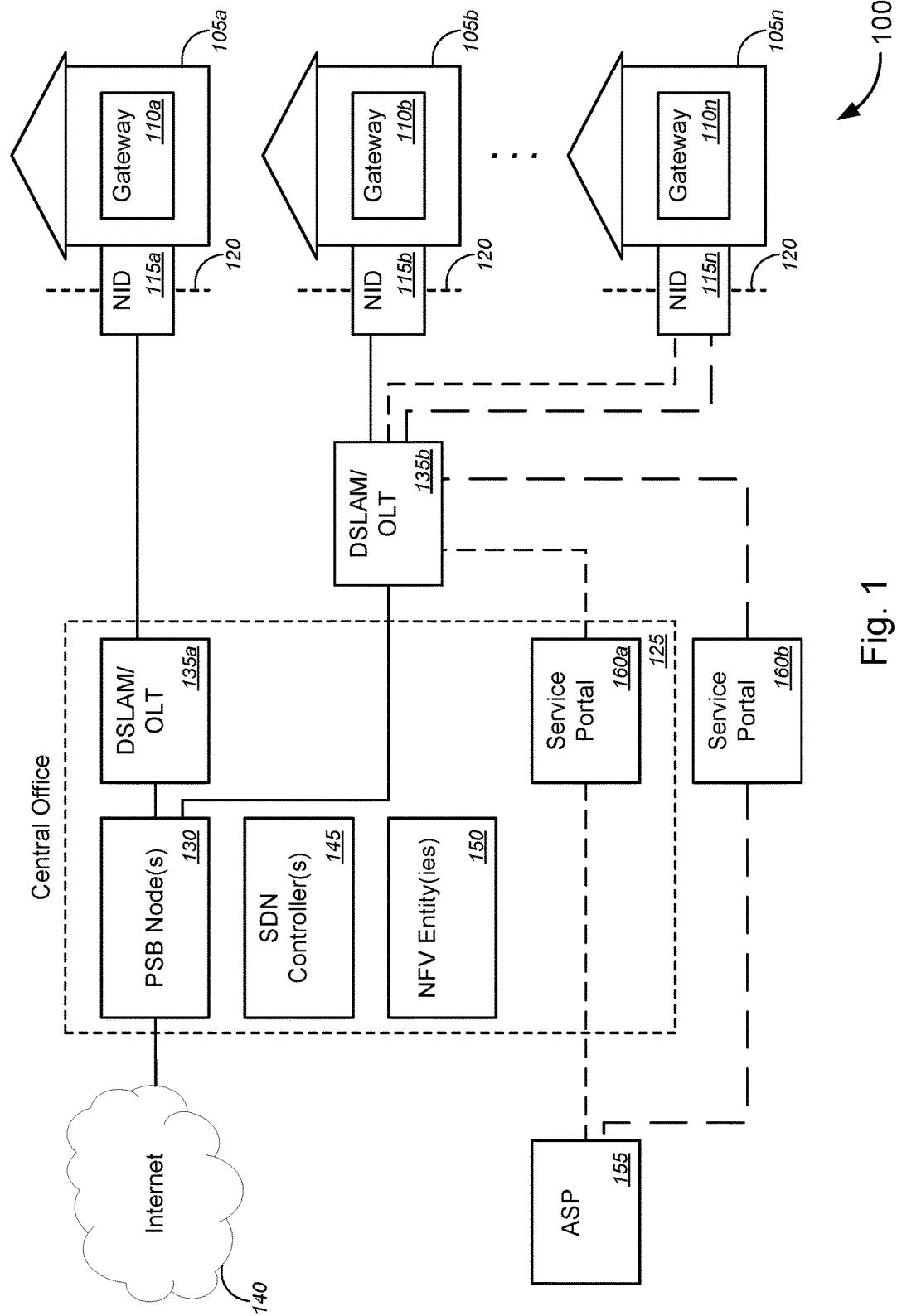
FIG. 1 is a schematic diagram illustrating a system for implementing extension of a customer LAN at a provider network service point(s) and/or implementing isolated service overlays between a provider network service point(s) and a customer premises, in accordance with various embodiments.

Various embodiments provide tools and techniques for implementing extension of customer local area networks ("LANs") and/or implementing isolated service overlays over a network, and, in particular embodiments, to methods, systems, apparatus, and computer software for implementing extension of customer LANs at a provider network service point(s) and/or implementing isolated service overlays between the provider network service point(s) and each of one or more customer premises.

In various embodiments, a network service point that is located external to a demarcation point at each of a plurality of customer premises—e.g., located in a service provider network, such as at one of a central office ("CO"), a digital subscriber line access multiplexer ("DSLAM"), an optical line terminal ("OLT"), a network access point ("NAP"), a network interface device ("NID"), or an enhanced NID ("eNID"), and/or the like—might establish a connection between a service provider network (e.g., a wide area network ("WAN") or the like) and a customer LAN, which has already been established within a customer premises. The system subsequently extends, via this connection, the customer LAN to span between the network service point and the customer premises. In some cases, extending the customer LAN to span between the network service point and the customer premises might comprise extending the customer LAN to span between the network service point and the customer premises by utilizing one or more of network functions virtualization ("NFV") or software-defined networks ("SDNs").

According to some embodiments, the system might map between the service provider network and the customer LAN (i.e., mapping one network to the other, and/or vice versa), in some cases, via at least one of a router function, a mapper function, a programmable services backbone ("PSB") function, a NFV function, or a SDN function, and/or the like. Herein, "programmable services backbone" (also referred to as "platform services backbone") might refer to a network backbone or a network services backbone that is programmable, and, in some embodiments, may be programmable by utilizing one or both of NFV (which covers orchestration as well as virtualization layer infrastructure and management, and/or the like) and/or SDN (which covers software defined networking).

Alternatively, or additionally, the system might establish two or more isolated service overlays—which might include, without limitation, two or more of a secure data service overlay, an Internet service overlay, an Internet of Things ("IoT") service overlay, a PSB service overlay, a content delivery network ("CDN") service overlay, one or more application service overlays each associated with an application service provider, or one or more other service overlays each associated with a service provider, and/or the like—across the customer LAN between the network service point and the customer premises, each of the two or more isolated service overlays having network traffic that is isolated from network traffic transmitted along another of the two or more isolated service overlays. In this manner, full isolation, security, privacy enforcement, placement of apps, data, and/or content in each or any overlay 425, and/or any combination of these functions may be achieved, for each customer at each customer premises. In some embodiments, establishing the two or more isolated service overlays across the customer LAN between the network service point and the customer premises might comprise establishing one of a virtual LAN ("VLAN") or a virtual extensible LAN ("VXLAN") for each of the two or more isolated service overlays across the customer LAN between the network service point and the customer premises. According to some embodiments, the WAN comprises separated overlays that are treated via a border network gateway or broadband network gateway ("BNG") and/or gateway function as they are mapped into the LAN. On the LAN side, multiple methods and technologies—including, but not limited to, virtual private networks ("VPNs"), secure shell tunnels, and/or the like—may be utilized to transport the service, to extend the WAN overlay into the LAN.

In some cases, mapping between the service provider network and the customer LAN might comprise mapping between the service provider network and the customer LAN for each of the two or more isolated service overlays, in some cases, via at least one of a router function, a mapper function, a PSB function, a NFV function, or a SDN function. According to some embodiments, the system might further selectively place at least one of a firewall, an application, or content in any one or more of the two or more isolated service overlays, without affecting network traffic or network service along any other of the two or more isolated service overlays.

The implementation of the WAN/LAN interface at a network service point that is outside of the customer premises (i.e., in the service provider network, or otherwise on the network-side of the demarcation point) and/or implementation of the two or more service overlays allow for, among other things, one or more of agility in the implementation or instantiation of new services, better overlay isolation, improved privacy, improved privacy enforcement with the ability to place firewalls and/or applications in each or any stream at will, improved security, stronger customer control of the LAN-to-WAN (or WAN-to-LAN) mapping via PSB and/or NFV functions, hosting economics via shared central office resources, and/or the like. This implementation represents a service paradigm change from a "WAN Access"-type of service (like "Internet Access") to a platform-based service that is composed of (in some embodiments) NFV compute nodes, as well as gateways at the Central Office, the Access, and the local LAN switch at each customer site. In such implementation, the customer owns or controls resources at the Central Office (or other network service point(s) outside the customer premises), and all the "WAN" services have very high speed connectivity to the customer compute resources in the Central Office (or other network service point(s) outside the customer premises), thereby relieving any "access bottlenecks" that may be associated with the conventional WAN/LAN interface at the customer premises, and providing the customer with a network resource on his or her local LAN that propagates from the customer premises to the Central Office over his or her "Access pipe." This changes Access from a WAN component to a customer-owned or customer-controlled resource where the customer controls the network gateway to his or her LAN resources at the network site, at the Access, and at his or her local customer site equipment, as a "platform service."

Various other embodiments provide tools and techniques for implementing network enhanced gateway functionality, and, in particular embodiments, to methods, systems, apparatus, and computer software for implementing network enhanced gateway functionality using network functions virtualization ("NFV") and/or software defined networks ("SDNs"). The network enhanced gateway functionalities can be implemented in conjunction with one or both of extension of customer local area networks ("LANs") and/or implementation of isolated service overlays over a network.

In various embodiments, a network switch, which is disposed within a gateway device, might route network traffic to a host computing system, at least a portion of the network traffic being originally directed to a client device via the network switch and via a corresponding client port among a plurality of client ports. Based at least in part on one or more characteristics of the at least a portion of the network traffic that is directed to the client device, the host computing system selects one or more virtual network functions ("VNFs"). The selected one or more VNFs are then sent to the host computing system via the network switch. In some embodiments, the client devices might be VNF-capable (including, but not limited to, a set-top box or a local Internet of Things ("IoT") controller, and/or the like), and the host computing system might send one or more second VNFs (which might be the same as the selected one or more VNFs or might be based on the selected one or more VNFs) to the client devices via the network switch and corresponding client port. According to some embodiments, the network switch and the host computing system are under control of a NFV entity and/or a SDN controller, which provide network enhanced gateway functionalities to the gateway device, as described herein. In some cases, the NFV entity might include, but is not limited to, at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like.

The network traffic between the network switch and the host computing system, in some embodiments, is at least one of uni-directional network traffic, bi-directional network traffic, or split directional network traffic that originates from at least one of one or more of the plurality of client ports or one or more network ports. In some cases, the one or more characteristics of the received network traffic comprises at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions, and/or the like.

According to some embodiments, the host computing system and the network switch are disposed within a single gateway device. Alternatively, or additionally, the host computing system (or a second host computing system) might be located external to a gateway device in which the network switch is disposed, the gateway device might comprise a host port(s), and the host computing system might communicatively couple to the network switch via the host port(s). The gateway device, in some embodiments, might include, without limitation, at least one of a customer premises equipment ("CPE"), a router, a switch, a network element, a demarcation device, a WiFi gateway device, a hypervisor platform, and one or more virtual machine-based host machines, and/or the like. The CPE, which might be located at or near a customer premises associated with a user of the client device, might comprise at least one of an optical network terminal ("ONT"), a network interface device ("NID"), an enhanced NID ("eNID"), a residential gateway ("RG") device, a business gateway ("BG") device, or a virtual gateway ("vG") device, and/or the like.

Merely by way of example, the client device might comprise a user device, including, but not limited to, one of a tablet computer, a smart phone, a mobile phone, a portable gaming device, a laptop computer, or a desktop computer, and/or the like. Alternatively, the client device might include a device selected from a group consisting of a small form factor pluggable ("SFP") device, an enhanced SFP ("SFP+") device, a compact SFP ("CSFP") device, a gigabit interface converter ("GBIC"), and a universal serial bus ("USB") pluggable device, and/or the like. In some cases, at least one of the SFP device, the SFP+ device, or the CSFP device might comprise at least one of a SFP network interface device ("NID"), a SFP router, a SFP modem, or a SFP wireless access point, and/or the like. In some instances, the USB pluggable device might comprise one of a printer, a scanner, a combination printer/scanner device, an external hard drive, a camera, a keyboard, a mouse, a drawing interface device, or a mobile device, and/or the like.

In some embodiments, the one or more VNFs provide the client device with one or more functions, the one or more functions comprising at least one of an activation function, an operation function, a deletion function, a specialized function, a firewall function, an Internet of Things ("IoT") proxy function, an application-related function, or an operations, administration, and management ("OAM") function, and/or the like. In some cases, the specialized function might itself be a VNF. According to some embodiments, each of the plurality of client ports might include, without limitation, one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port, and/or the like.

In various aspects, the host computing system might comprise one or more computing cores, preferably two or more computing cores. In some cases, at least one first computing core might perform functions of a gateway device, while at least one second computing core might perform hypervisor functions to support VNFs. According to some embodiments, the host computing system might comprise at least one of an x86 host computing device or an advanced reduced instruction set computer ("RISC") machine ("ARM") computing device. In some embodiments, the network switch might be a virtual network switch that utilizes a network switch VNF to provide network switching functionality. In some instances, the transceiver might be a virtual transceiver that utilizes a transceiver VNF to provide transceiver functionality.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, network resource allocation technology, network service implementation technology, and/or the like. In other aspects, certain embodiments, can improve the functioning of user equipment or systems themselves (e.g., telecommunications equipment, service provider networks, customer local area networks, network components, etc.), for example, by enabling extension of the customer LAN to span between the customer premises (in which the LAN is established) and a network service point in the service provider network (i.e., beyond the demarcation point), by establishing two or more isolated service overlays (including, but not limited to, isolated service overlays for secure data, Internet, IoT, PSB, CDN, apps, other services, and/or the like) across the customer LAN between the network service point and the customer premises, or a combination of these functionalities, and/or the like. In particular, to the extent any abstract concepts are present in the various embodiments, those concepts can be implemented as described herein by devices, software, systems, and methods that involve specific novel functionality (e.g., steps or operations), such as extending the customer LAN to span between the customer premises (in which the LAN is established) and a network service point in the service provider network (i.e., beyond the demarcation point), establishing the two or more isolated service overlays (including, but not limited to, isolated service overlays for secure data, Internet, IoT, PSB, CDN, apps, other services, and/or the like) across the customer LAN between the network service point and the customer premises, and/or the like, to name a few examples, that extend beyond mere conventional computer processing operations. These functionalities can produce tangible results outside of the implementing computer system, including, merely by way of example, agility in the implementation or instantiation of new services, better overlay isolation, improved privacy, improved privacy enforcement with the ability to place firewalls and/or applications in each or any stream at will, improved security, stronger customer control of the LAN-to-WAN (or WAN-to-LAN) mapping via PSB and/or NFV functions, hosting economics via shared central office resources, and/or the like, at least some of which may be observed or measured by customers and/or service providers.

In an aspect, a method might comprise establishing, at a network service point in a service provider network, a connection between the service provider network and a customer local area network ("LAN"), the customer LAN being established within a customer premises of a plurality of customer premises. The method might further comprise establishing two or more isolated service overlays across the connection between the network service point and the customer premises, each of the two or more isolated service overlays having network traffic that is isolated from network traffic transmitted along another of the two or more isolated service overlays.

In some embodiments, the two or more isolated service overlays might comprise two or more of a secure data service overlay, an Internet service overlay, an Internet of Things ("IoT") service overlay, a programmable services backbone ("PSB") service overlay, a content delivery network ("CDN") service overlay, one or more application (or app) service overlays each associated with an application service provider, or one or more other service overlays each associated with a service provider, and/or the like. In some cases, establishing the two or more isolated service overlays across the customer LAN between the network service point and the customer premises might comprise establishing one of a virtual LAN ("VLAN") or a virtual extensible LAN ("VXLAN"), and/or the like, for each of the two or more isolated service overlays across the customer LAN between the network service point and the customer premises.

According to some embodiments, the network service point might be located at one of an edge switch, a central office, or a digital subscriber line access multiplexer ("DSLAM"), and/or the like. Alternatively, or additionally, the network service point might be located at one of an optical line terminal ("OLT"), a network access point ("NAP"), a network interface device ("NID"), or an enhanced NID ("eNID"), and/or the like, each of which is located near or within the customer premises.

In some cases, establishing the connection between the service provider network and the customer LAN might comprise one of establishing a wireless connection between the service provider network and the customer LAN, establishing a wired connection between the service provider network and the customer LAN, establishing a hybrid wireless/wired connection between the service provider network and the customer LAN, or establishing a backup connection between the service provider network and the customer LAN, and/or the like.

Merely by way of example, in some embodiments, the method might further comprise mapping between the service provider network and the customer LAN (i.e., mapping one network to the other, and/or vice versa) for each of the two or more isolated service overlays. In some cases, mapping between the service provider network and the customer LAN for each of the two or more isolated service overlays might comprise mapping between the service provider network and the customer LAN for each of the two or more isolated service overlays, via at least one of a router function, a mapper function, a programmable services backbone ("PSB") function, a network functions virtualization ("NFV") function, or a software-defined network ("SDN") function, and/or the like.

According to some embodiments, the method might further comprise selectively placing at least one of a firewall, an application, or content, and/or the like, in any one or more of the two or more isolated service overlays, without affecting network traffic or network service along any other of the two or more isolated service overlays.

In another aspect, a system might comprise a gateway device located at a customer premises of a plurality of customer premises and a network node located at a network service point in a service provider network. The gateway device might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the gateway device to establish a customer local area network ("LAN") within the customer premises. The network node might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the network node to establish, at the network service point, a connection between the service provider network and the customer LAN and to establish two or more isolated service overlays across the connection between the network service point and the customer premises, each of the two or more isolated service overlays having network traffic that is isolated from network traffic transmitted along another of the two or more isolated service overlays.

In some embodiments, the two or more isolated service overlays might comprise two or more of a secure data service overlay, an Internet service overlay, an Internet of Things ("IoT") service overlay, a programmable services backbone ("PSB") service overlay, a content delivery network ("CDN") service overlay, one or more application (or app) service overlays each associated with an application service provider, or one or more other service overlays each associated with a service provider, and/or the like. In some cases, establishing the two or more isolated service overlays across the customer LAN between the network service point and the customer premises might comprise establishing one of a virtual LAN ("VLAN") or a virtual extensible LAN ("VXLAN"), and/or the like, for each of the two or more isolated service overlays across the customer LAN between the network service point and the customer premises.

According to some embodiments, the network service point might be located at one of an edge switch, a central office, or a digital subscriber line access multiplexer ("DSLAM"), and/or the like. Alternatively, or additionally, the network service point might be located at one of an optical line terminal ("OLT"), a network access point ("NAP"), a network interface device ("NID"), or an enhanced NID ("eNID"), and/or the like, each of which is located near or within the customer premises.

In some cases, establishing the connection between the service provider network and the customer LAN might comprise one of establishing a wireless connection between the service provider network and the customer LAN, establishing a wired connection between the service provider network and the customer LAN, establishing a hybrid wireless/wired connection between the service provider network and the customer LAN, or establishing a backup connection between the service provider network and the customer LAN, and/or the like.

Merely by way of example, in some embodiments, the second set of instructions, when executed by the at least one second processor, might further cause the network node to map between the service provider network and the customer LAN (i.e., to map one network to the other, and/or vice versa) for each of the two or more isolated service overlays. In some cases, mapping between the service provider network and the customer LAN for each of the two or more isolated service overlays might comprise mapping between the service provider network and the customer LAN for each of the two or more isolated service overlays, via at least one of a router function, a mapper function, a programmable services backbone ("PSB") function, a network functions virtualization ("NFV") function, or a software-defined network ("SDN") function, and/or the like.

According to some embodiments, the second set of instructions, when executed by the at least one second processor, might further cause the network node to selectively place at least one of a firewall, an application, or content, and/or the like, in any one or more of the two or more isolated service overlays, without affecting network traffic or network service along any other of the two or more isolated service overlays.

In yet another aspect, an apparatus might be provided that is located at a network service point in a service provider network. The apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to establish, at the network service point, a connection between the service provider network and a customer local area network ("LAN"), the customer LAN being established within a customer premises of a plurality of customer premises, and to establish two or more isolated service overlays across the connection between the network service point and the customer premises, each of the two or more isolated service overlays having network traffic that is isolated from network traffic transmitted along another of the two or more isolated service overlays.

In some embodiments, the two or more isolated service overlays might comprise two or more of a secure data service overlay, an Internet service overlay, an Internet of Things ("IoT") service overlay, a programmable services backbone ("PSB") service overlay, a content delivery network ("CDN") service overlay, one or more application (or app) service overlays each associated with an application service provider, or one or more other service overlays each associated with a service provider, and/or the like. In some cases, establishing the two or more isolated service overlays across the customer LAN between the network service point and the customer premises might comprise establishing one of a virtual LAN ("VLAN") or a virtual extensible LAN ("VXLAN"), and/or the like, for each of the two or more isolated service overlays across the customer LAN between the network service point and the customer premises.

According to some embodiments, the network service point might be located at one of an edge switch, a central office, or a digital subscriber line access multiplexer ("DSLAM"), and/or the like. Alternatively, or additionally, the network service point might be located at one of an optical line terminal ("OLT"), a network access point ("NAP"), a network interface device ("NID"), or an enhanced NID ("eNID"), and/or the like, each of which is located near or within the customer premises.

In some cases, establishing the connection between the service provider network and the customer LAN might comprise one of establishing a wireless connection between the service provider network and the customer LAN, establishing a wired connection between the service provider network and the customer LAN, establishing a hybrid wireless/wired connection between the service provider network and the customer LAN, or establishing a backup connection between the service provider network and the customer LAN, and/or the like.

Merely by way of example, in some embodiments, the set of instructions, when executed by the at least one processor, might further cause the apparatus to map between the service provider network and the customer LAN (i.e., to map one network to the other, and/or vice versa) for each of the two or more isolated service overlays. In some cases, mapping between the service provider network and the customer LAN for each of the two or more isolated service overlays might comprise mapping between the service provider network and the customer LAN for each of the two or more isolated service overlays, via at least one of a router function, a mapper function, a programmable services backbone ("PSB") function, a network functions virtualization ("NFV") function, or a software-defined network ("SDN") function, and/or the like.

According to some embodiments, the set of instructions, when executed by the at least one processor, might further cause the apparatus to selectively place at least one of a firewall, an application, or content, and/or the like, in any one or more of the two or more isolated service overlays, without affecting network traffic or network service along any other of the two or more isolated service overlays.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

Figure 3:
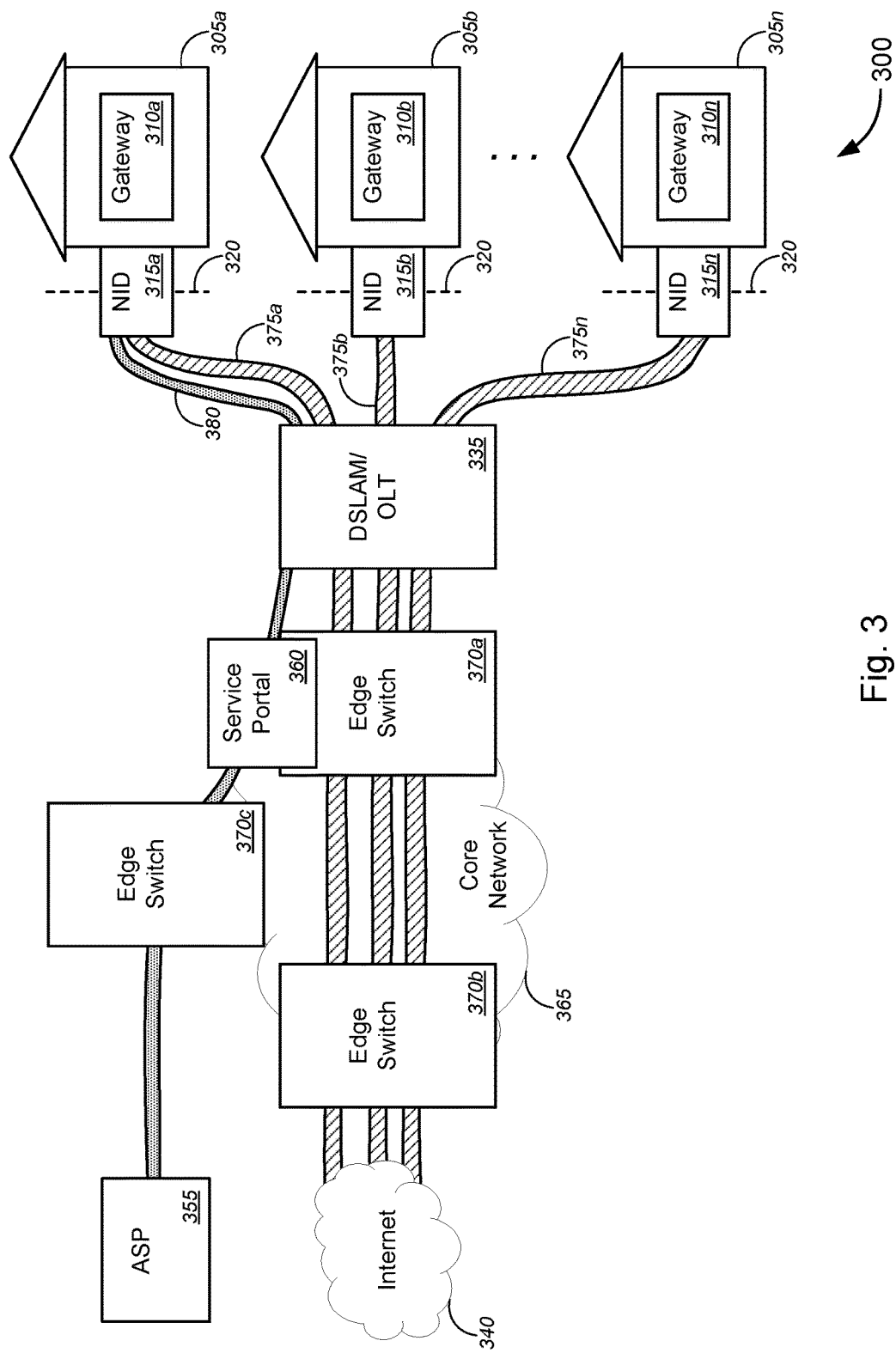
FIG. 3 is a schematic diagram illustrating a system for implementing content delivery to a customer without affecting Internet service for other customers, in accordance with various embodiments.
Figure 4:
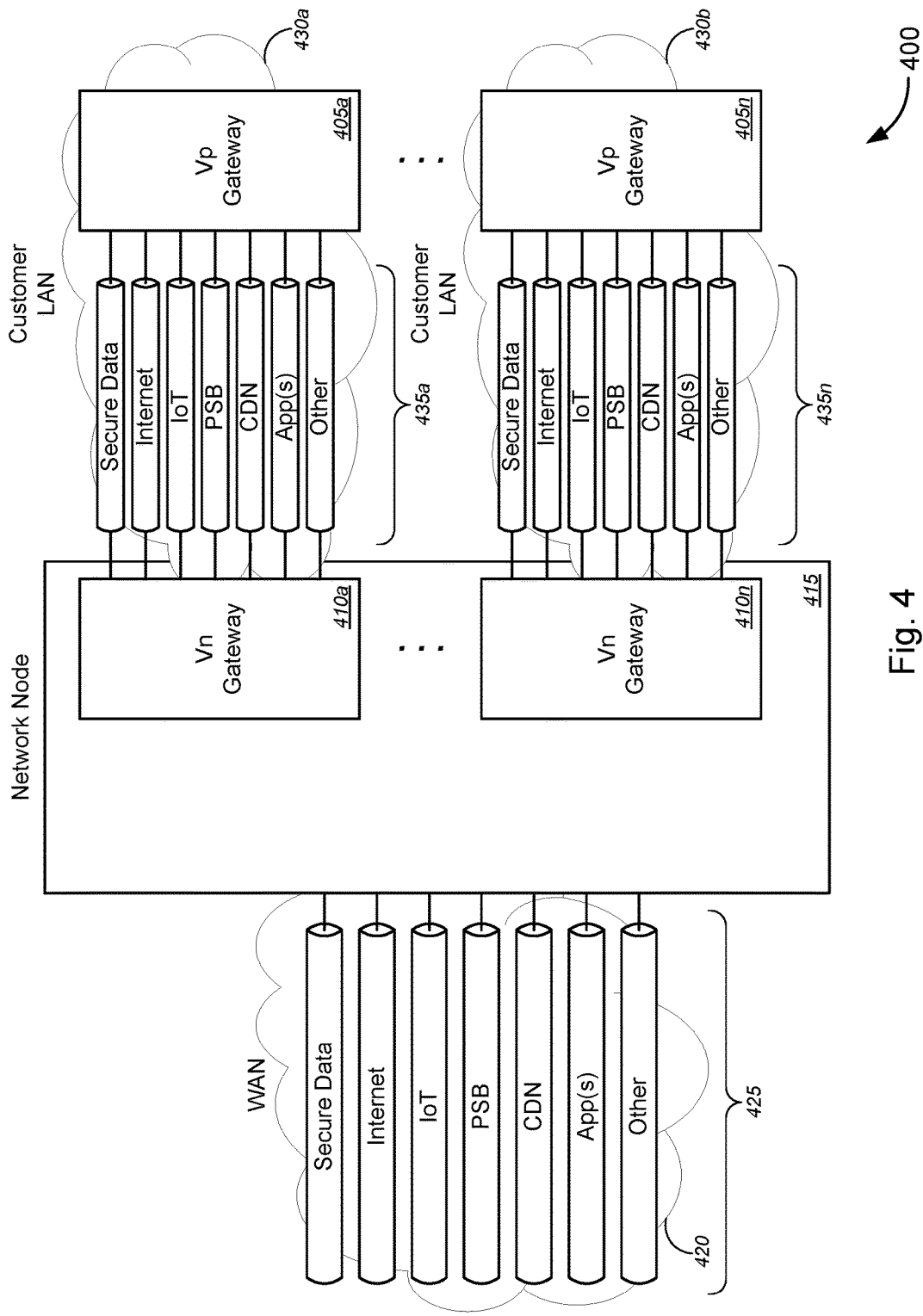
FIG. 4 is a schematic diagram illustrating a system for implementing isolated service overlays between a provider network service point(s) and each of a plurality of customer premises, in accordance with various embodiments.
Figure 5:
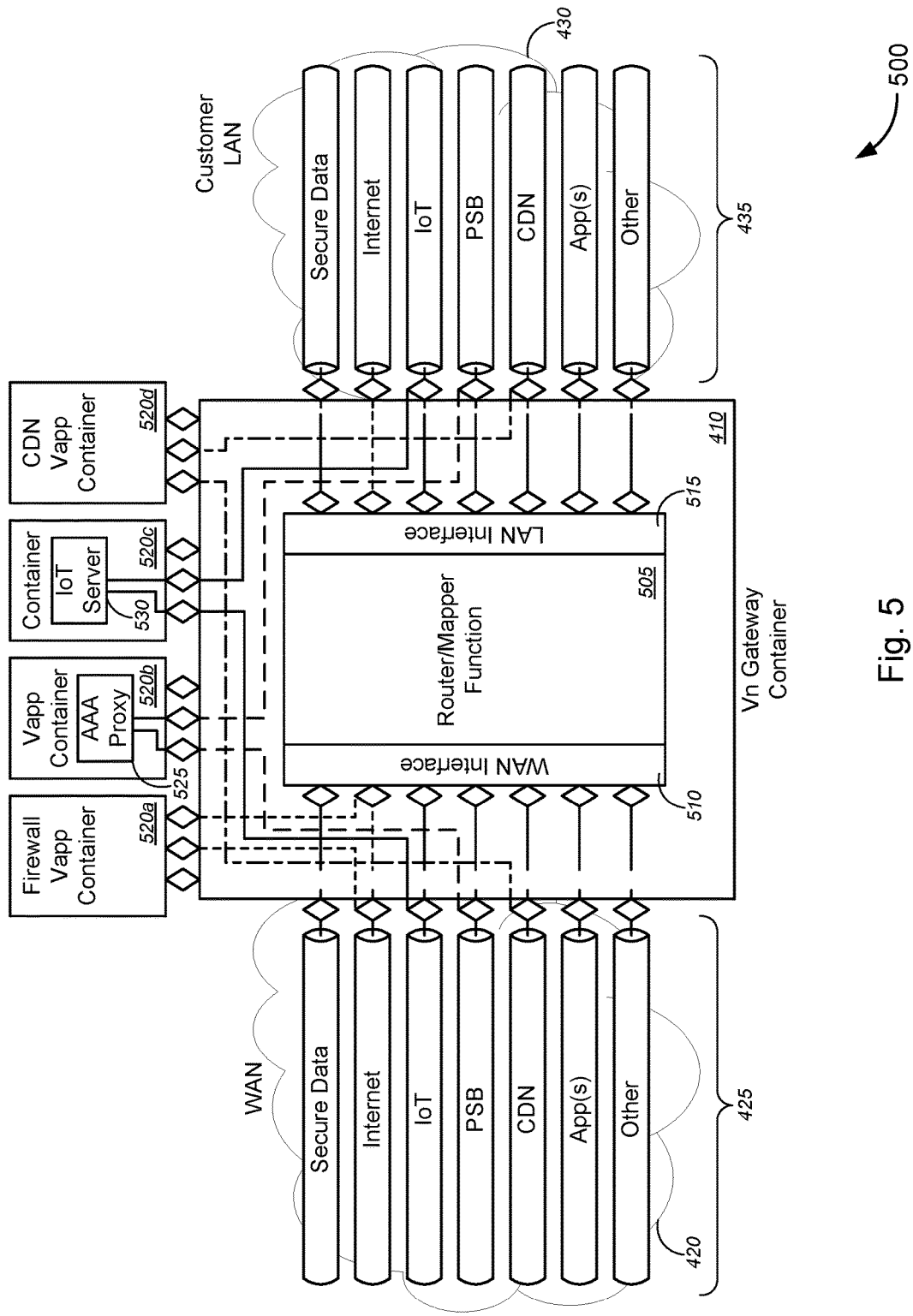
FIG. 5 is a schematic diagram illustrating a system for implementing isolated service overlays between a provider network service point(s) and a customer premises, in accordance with various embodiments.
Figure 13:
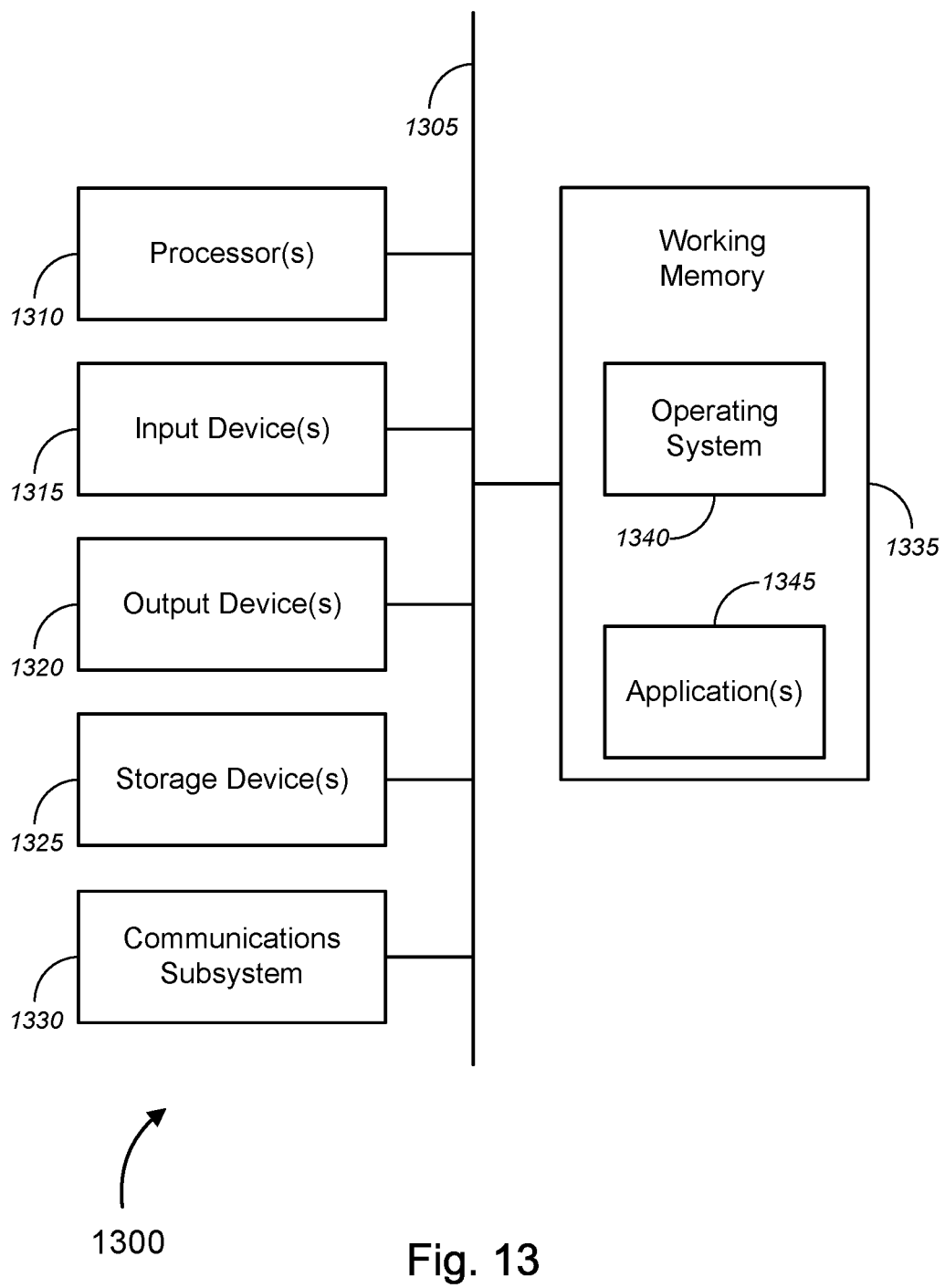
FIG. 13 is a block diagram illustrating an exemplary computer or system hardware architecture, in accordance with various embodiments.
Figure 14:
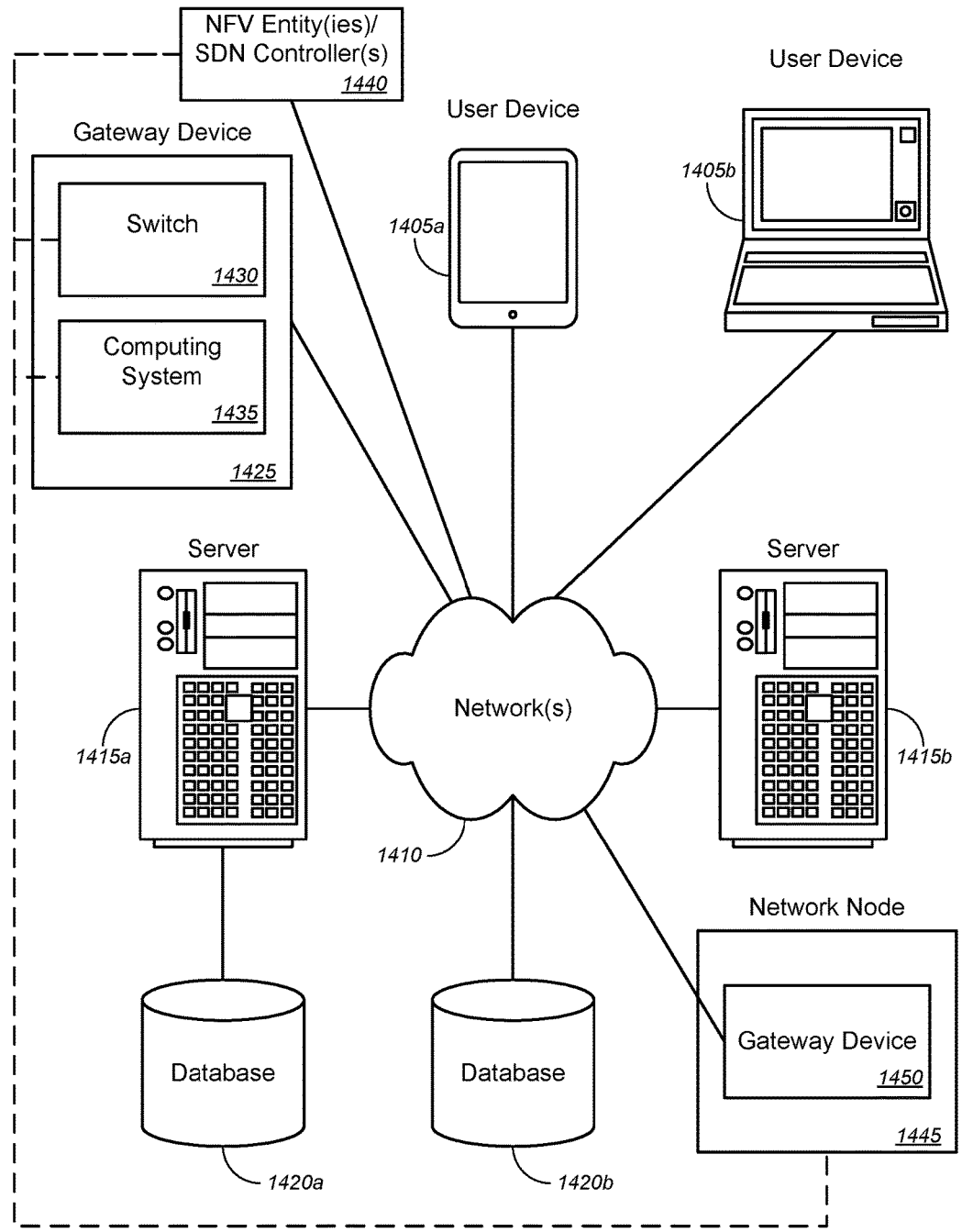
FIG. 14 is a block diagram illustrating a networked system of computers, computing systems, or system hardware architecture, which can be used in accordance with various embodiments.

We now turn to the embodiments as illustrated by the drawings. FIGS. 1-14 illustrate some of the features of the method, system, and apparatus for implementing extension of customer local area networks ("LANs"), implementing isolated service overlays over a network, and/or implementing network enhanced gateway functionality, and, in particular embodiments, to methods, systems, apparatus, and computer software for implementing extension of customer LANs at a provider network service point(s), implementing isolated service overlays between the provider network service point(s) and each of one or more customer premises, and/or implementing network enhanced gateway functionality using network functions virtualization ("NFV") and/or software defined networks ("SDNs"), as referred to above. FIG. 1 illustrates a system for implementing extension of customer LANs at a provider network service point(s) and/or implementing isolated service overlays between the provider network service point(s) and each of one or more customer premises. FIGS. 2A-2C and 6 illustrate some of the specific (although non-limiting) exemplary features of the method, system, and apparatus for implementing extension of a customer LAN at a provider network service point(s). FIG. 3 illustrates specific (although non-limiting) exemplary features of a system for implementing content delivery to a customer without affecting Internet service for other customers. FIGS. 4, 5, and 7 illustrate some of the specific (although non-limiting) exemplary features of the method, system, and apparatus for implementing isolated service overlays between a provider network service point(s) and a customer premises (or each of a plurality of customer premises). FIGS. 8-12 illustrate some of the specific (although non-limiting) exemplary features of the method, system, and apparatus for implementing network enhanced gateway functionality. FIGS. 13 and 14 illustrate exemplary system and hardware implementation. The methods, systems, and apparatuses illustrated by FIGS. 1-14 refer to examples of different embodiments that include various components and steps, which can be considered alternatives or which can be used in conjunction with one another in the various embodiments. The description of the illustrated methods, systems, and apparatuses shown in FIGS. 1-14 is provided for purposes of illustration and should not be considered to limit the scope of the different embodiments.

With reference to the figures, FIG. 1 is a schematic diagram illustrating a system 100 for implementing extension of a customer LAN at a provider network service point(s) and/or implementing isolated service overlays between a provider network service point(s) and a customer premises, in accordance with various embodiments.

In FIG. 1, system 100 might comprise a plurality of customer premises 105, which might comprise a first customer premises 105a, a second customer premises 105b, through an $N^{th}$ customer premises 105n. Each of the first through $N^{th}$ customer premises 105a-105n might include, without limitation, one of customer residences (e.g., single-family homes, multi-dwelling units ("MDUs"), etc.), commercial or business customer premises, industrial customer premises, and/or the like. In various embodiments, system 100 might further comprise at least one of a gateway device 110 and/or a network interface device ("NID") 115 located at or near each of the customer premises 105. In some cases, the gateway device 110 might include, without limitation, at least one of a residential gateway ("RG") device, a business gateway ("BG") device, a virtual gateway ("vG") device, a modem, a router, a network switch, and/or the like. The NID 115 might comprise at least one of an optical network terminal ("ONT"), a copper-fed network interface device ("NID"), or an enhanced NID ("eNID"), and/or the like. In some embodiments, the gateway device 110 might be located within the customer premises, while the NID 115 might be located on an exterior wall or telecommunications room/closet of the customer premises, the NID 115 serving as a demarcation point 120 that typically or traditionally marks the end of a public network associated with a telecommunications company or a network service provider and the beginning of a private network associated with a customer who is associated with the particular customer premises. With reference to the embodiments of at least FIGS. 2B, 2C, and 6 below, the demarcation point as a physical marker of the end of the public network and the beginning of the private network no longer applies, as described in detail in those embodiments. According to some embodiments, the gateway device 110 and the NID 115 might be embodied as a single device that is either located within the customer premises or located on an exterior wall or telecommunications room/closet of the customer premises.

System 100 might further comprise, at a central office ("CO") 125, at least one programmable services backbone ("PSB") node 130. Herein, "programmable services backbone" (also referred to as "platform services backbone") might refer to a network backbone or a network services backbone that is programmable, and, in some embodiments, may be programmable by utilizing one or both of NFV (which covers orchestration as well as virtualization layer infrastructure and management, and/or the like) and/or SDN (which covers software defined networking). System 100 might also comprise a digital subscriber line access multiplexer ("DSLAM") or an optical line terminal ("OLT") 135 (collectively, "DSLAM/OLT 135"), which might be either a CO-based DSLAM/OLT 135a that is located in the CO 125 and/or an external DSLAM/OLT 135b that is located in between the CO 125 and the plurality of customer premises 105. In some cases, in place of a DSLAM, a cable modem termination system ("CMTS") might be used. The at least one PSB node 130, in CO 125, might provide Internet service or other network service from Internet 140 to one or more customer premises of the plurality of customer premises 105 via one or both DSLAMs/OLTs 135, via NIDs 115, and/or via gateway devices 110, or the like, as shown by the solid line connecting Internet 140 to the NIDs 115a and 115b, through the at least one PSB node 130 and through one of DSLAM/OLT 135a or 135b.

According to some embodiments, system 100 might further comprise one or more software-defined network ("SDN") controllers 145, one or more NFV entities 150, or both that provide programmable and/or virtual network functionalities to components in the network, such as, but not limited to, gateway devices 110, NIDs 115, DSLAMs 135, OLTs 135, and/or the like. In some cases, each NFV entity might include, but is not limited to, at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like, not unlike the NFV entities as described in the embodiments of FIGS. 8-11 below.

In some embodiments, system 100 might comprise an application service provider ("ASP") or ASP server(s) 155 that might provide at least one of software applications ("apps"), media content (e.g., video, image, audio, game content, and/or the like), data content, and/or the like to customer premises 105, via one or both of service portal 160a located within CO 125 and/or service portal 160b located external to CO 125, via one or both of CO-based DSLAM/OLT 135a and/or external DSLAM/OLT 135b, via one or both of NID 115 and/or gateway device 110. In some instances, the one or more SDN controllers 145 and/or the one or more NFV entities 150 might provide programmable and/or virtual network functionalities to one or both of the service portal 160a located within CO 125 and/or the service portal 160b located external to CO 125.

In operation, system 100 might implement extension of a customer LAN at a provider network service point(s) (as described in detail with reference to FIGS. 2A-2C and 6 below), implement content delivery to a customer without affecting Internet service (e.g., high speed Internet service) for other customers (as described in detail with reference to FIG. 3 below), implement isolated service overlays between a provider network service point(s) and a customer premises (as described in detail with reference to FIGS. 4, 5, and 7 below), or a combination of these functions.

Figure 2A:
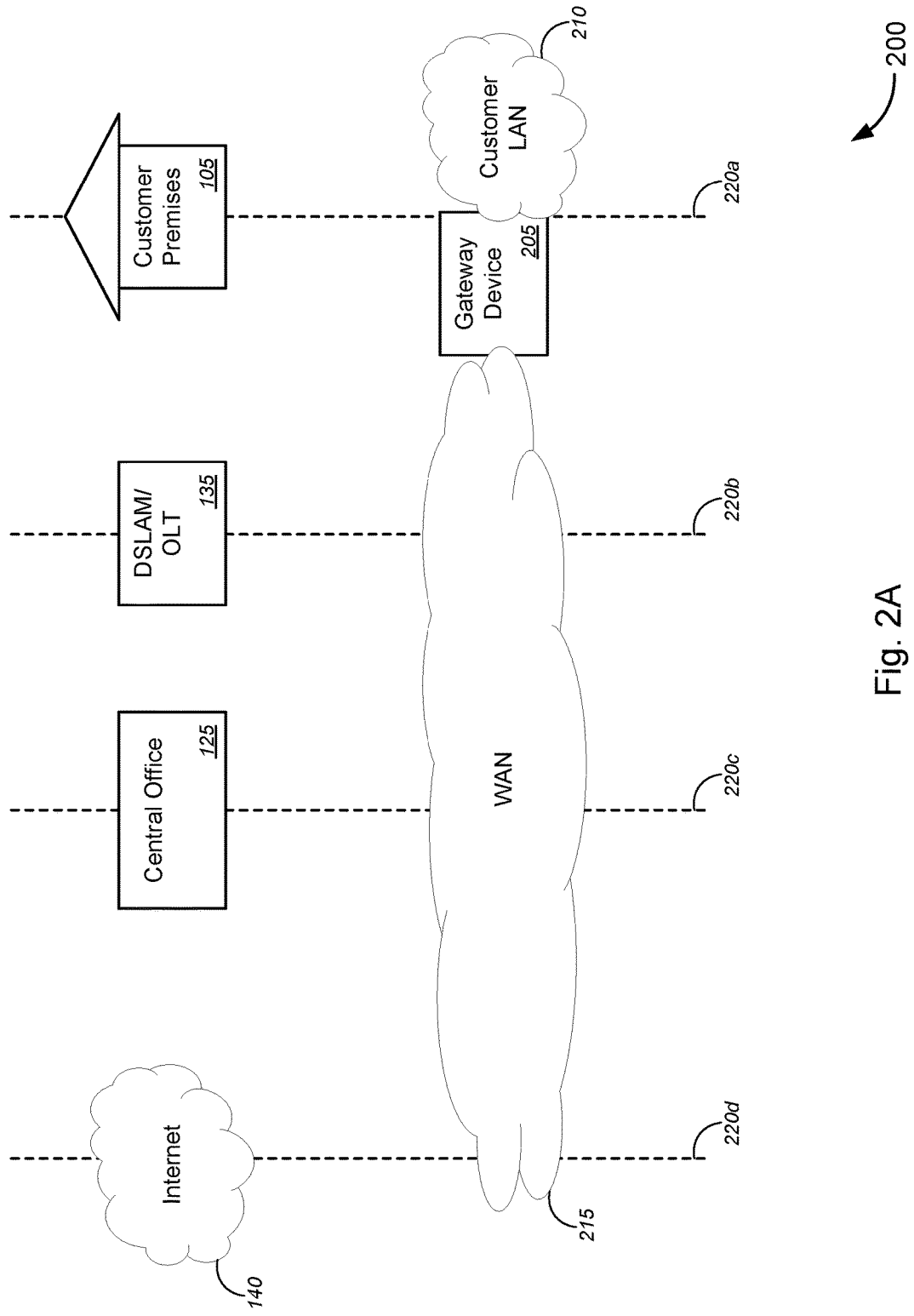
FIGS. 2A-2C are schematic diagrams illustrating various systems for implementing extension of a customer LAN at a provider network service point(s), in accordance with various embodiments.
Figure 2B:
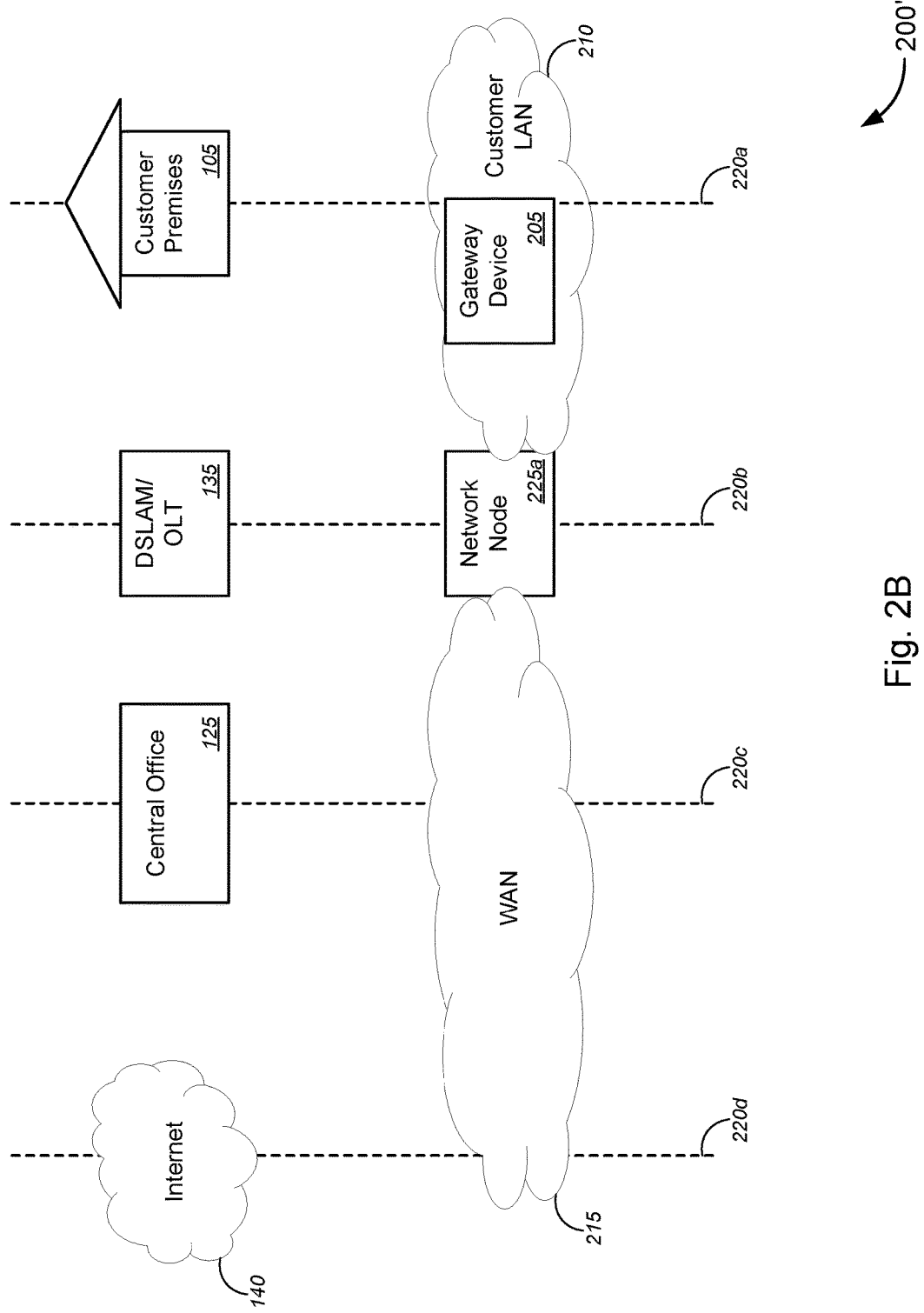
Figure 2C:
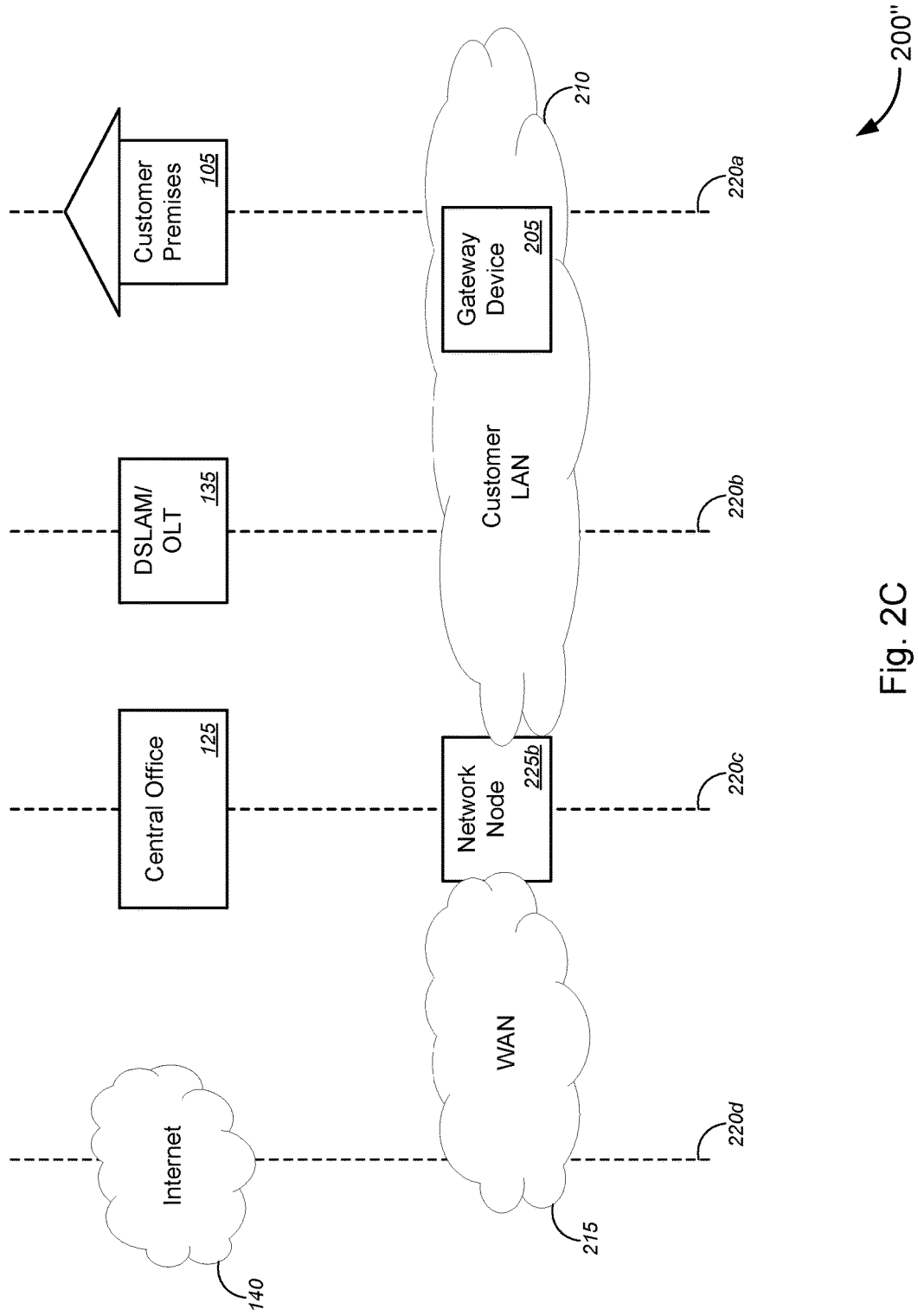

FIGS. 2A-2C (collectively, "FIG. 2") are schematic diagrams illustrating various systems 200, 200', and 200" for implementing extension of a customer LAN at a provider network service point(s), in accordance with various embodiments. FIG. 2A depicts a system 200 in which a gateway device 205, which might be located at customer premises 105, establishes a (network) connection between a customer LAN 210 and a service provider network 215 (in this case, a wide area network ("WAN") 215, although not necessarily limited to a WAN). Herein, gateway device 205 might correspond to one or both of gateway device 110 and/or NID 115 of FIG. 1.

In FIG. 2, dash lines 220 represent the relative positions of the gateway device 205, the customer LAN 210, the WAN 215, and other components of the network (e.g., components in the CO 125, the DSLAM/OLT 135, or the like as shown in FIG. 1, network node 225a shown in FIG. 2B, network node 225b shown in FIG. 2C, and the like). As shown in FIG. 2A, the gateway device 205 and the customer LAN 210 might be located at customer premises 105 (which might include being located in, at, or on an exterior wall of customer premises 105, as appropriate or as desired) (as indicated by the dashed line 220a), while the WAN 215 might span a portion of the gateway device 205, DSLAM/OLT 135, CO 125, and Internet 140 (as indicated by the dashed lines 220b, 220c, and 220d). In some embodiments, FIG. 2A might represent a traditional or convention state in which the customer LAN 210 spans only the customer premises 105 (or a portion thereof), while the WAN 215 (or other service provider network) to which the customer LAN 210 interconnects via gateway device 205 spans a portion of the gateway device 205, DSLAM/OLT 135, CO 125, and Internet 140. In other embodiments, FIG. 2B represents an initial state prior to extension of the customer LAN 210 beyond the customer premises 105 (toward the CO 125), as described below with respect to FIGS. 2B and 2C.

In some embodiments, the gateway device 205 might provide transmission functions (i.e., transmission from/to WAN 215 to/from LAN 210), LAN switching functions, dynamic host configuration protocol ("DHCP") functions (which automatically assign Internet Protocol ("IP") addresses for the LAN so that computing and/or client devices can communicate), WAN routing functions, and/or the like.

We now turn to FIG. 2B, in which system 200' is similar to system 200 of FIG. 2A, except that system 200' further comprises network node 225a located at DSLAM/OLT 135 (which refers to external DSLAM/OLT 135b in FIG. 1) (as indicated by the dashed line 220b). In operation, network node 225a extends the customer LAN 210—via or using the connection between the service provider network (here, WAN 215) and the customer LAN 210—to span between the network node 225a (which is located at DSLAM/OLT 135 or external DSLAM/OLT 135b as shown in FIG. 1) and the customer premises 105. In other words, the network node 225a extends the customer LAN 210 (which only spans the customer premises 105 in the embodiment of FIG. 2A) beyond the customer premises 105 (i.e., beyond the demarcation point (e.g., demarcation point 120 of FIG. 1)). System 200' is otherwise similar, if not identical, to system 200 of FIG. 2A.

Alternatively, with reference to FIG. 2C, system 200", which is similar to system 200 of FIG. 2A or system 200' of FIG. 2B, further comprises network node 225b that is located at CO 125 (as indicated by the dashed line 220c). In operation, network node 225b extends the customer LAN 210—via or using the connection between the service provider network (here, WAN 215) and the customer LAN 210—to span between the network node 225b (which is located at CO 125) and the customer premises 105. In other words, like network node 225a of FIG. 2B, the network node 225b extends the customer LAN 210 (which only spans the customer premises 105 in the embodiment of FIG. 2A) beyond the customer premises 105 (i.e., beyond the demarcation point (e.g., demarcation point 120 of FIG. 1)).

In the embodiments of FIGS. 2B and 2C, in some aspects, network node 225a or 225b might provide at least one of WAN routing functions, an ability to virtualize applications on the WAN, and/or the like, while gateway device 205 might provide at least one of transmission functions (i.e., transmission from/to WAN 215 to/from LAN 210), LAN switching functions, dynamic host configuration protocol ("DHCP") functions, and/or the like. System 200" is otherwise similar, if not identical, to system 200 of FIG. 2A or system 200' of FIG. 2B.

FIG. 3 is a schematic diagram illustrating a system 300 for implementing content delivery to a customer without affecting Internet service (e.g., high speed Internet service, broadband service, etc.) for other customers, in accordance with various embodiments. In FIG. 3, system 300 might comprise a plurality of customer premises 305, which might comprise a first customer premises 305a, a second customer premises 305b, through an $N^{th}$ customer premises 305n. Each of the first through $N^{th}$ customer premises 305a-305n might include, without limitation, one of customer residences (e.g., single-family homes, multi-dwelling units ("MDUs"), etc.), commercial or business customer premises, industrial customer premises, and/or the like. In various embodiments, system 300 might further comprise at least one of a gateway device 310 and/or a network interface device ("NID") 315 located at or near each of the customer premises 305. In some cases, the gateway device 310 might include, without limitation, at least one of a residential gateway ("RG") device, a business gateway ("BG") device, a virtual gateway ("vG") device, a modem, a router, a network switch, and/or the like. The NID 315 might comprise at least one of an optical network terminal ("ONT"), a copper-fed network interface device ("NID"), or an enhanced NID ("eNID"), and/or the like. In some embodiments, the gateway device 310 might be located within the customer premises, while the NID 315 might be located on an exterior wall or telecommunications room/closet of the customer premises, the NID 315 serving as a demarcation point 320 that typically or traditionally marks the end of a public network associated with a telecommunications company or a network service provider and the beginning of a private network associated with a customer who is associated with the particular customer premises. With reference to the embodiments of at least FIGS. 2B and 2C above, and FIG. 6 below, the demarcation point as a physical marker of the end of the public network and the beginning of the private network no longer applies, as described in detail in those embodiments. According to some embodiments, the gateway device 310 and the NID 315 might be embodied as a single device that is either located within the customer premises or located on an exterior wall or telecommunications room/closet of the customer premises.

System 300 might further comprise one or more DSLAMs/OLTs 335 (which might correspond to one or both of CO-based DSLAM/OLT 135a and/or external DSLAM/OLT 135b of FIG. 1) and Internet 340. Between the one or more DSLAMs/OLTs 335 and the Internet 340, system 300 might comprise core network 365, which might comprise one or more edge switches 370. The one or more edge switches 370 might comprise a first edge switch 370a (located in core network 365, while being relatively close to the customer premises 305), a second edge switch 370b (located in core network 365, while being relatively close to the Internet 340 and further from the customer premises 305), and a third edge switch 370c (located in core network 365, while being relatively close to the customer premises 305, although not necessarily as close as the first edge switch 370a is to the customer premises 305). In operation, the core network (via at least the first edge switch 370a, the second edge switch 370b, the one or more DSLAMs/OLTs 335, and one or both of the NIDs 315 and the gateway devices 310) provides Internet service (e.g., high speed Internet, broadband Internet, and/or the like) to the customer premises 305 (as indicated by the shared pipes 375a through 375n).

In some embodiments, system 300 might further comprise one or more service portals 360. In some cases, the one or more service portals 360 might each be part of or communicatively coupled to one or more edge switches 370. In the embodiment of FIG. 3, a service portal 360 is part of the first edge switch 370a, and is also communicatively coupled to third edge switch 370c. System 300 might further comprise one or more ASPs or ASP servers 355, which might provide at least one of software applications ("apps"), media content (e.g., video, image, audio, game content, and/or the like), data content, and/or the like to customer premises 305—via third edge switch 370c, service portal 360, and at least one of the one or more DSLAMs/OLTs 335, and one or both of NID 315a and/or gateway device 310a—to customer premises 305a (as indicated by the service pipe 380).

In some embodiments, service portal 360 might be instantiated within first edge switch 370a using at least one of a PSB virtual function, a SDN controller, a NFV entity, a virtual network function ("VNF"), and/or the like. By routing the services of the ASP 355 in the manner as described above with respect to FIG. 3 (i.e., by feeding a service pipe 380 (which in some cases might be embodied as one of the service overlays as described in detail below with respect to FIGS. 4, 5, and 7) along the edge of the core network via the service portal 360), the Internet service provided by the network service provider to each of the customer premises is not impacted by the ASP service to the customer premises 305a.

Although FIG. 3 shows a single ASP or ASP server 355 providing service to one customer premises 305, this is merely for simplicity of illustration, and the various embodiments are not so limited. That is, any number or all of the customer premises 305a-305n might be serviced by the ASP or ASP server 355 (or a plurality of ASPs or ASP servers 355) in a similar manner through one or a plurality of service portals 360 (and edge switch(es) 370 and DSLAM(s)/OLT(s) 335, as appropriate or as desired).

Customer premises 305, gateway device 310, NID 315, demarcation point 320, DSLAM/OLT 335, Internet 340, ASP or ASP server 355, and service portal 360 might otherwise be similar, if not identical, to customer premises 105, gateway device 110, NID 115, demarcation point 120, DSLAM/OLT 135a and/or 135b, Internet 340, ASP or ASP server 355, and service portal 160a and/or 160b, respectively, as described above with respect to FIG. 1. System 300 might otherwise be similar, if not identical, to system 100 of FIG. 1.

FIGS. 4 and 5 are directed to implementing isolated service overlays. FIG. 4 is a schematic diagram illustrating a system 400 for implementing isolated service overlays between a provider network service point(s) and each of a plurality of customer premises, in accordance with various embodiments. FIG. 5 is a schematic diagram illustrating a system 500 for implementing isolated service overlays between a provider network service point(s) and a customer premises, in accordance with various embodiments.

In FIG. 4, system 400 might comprise one or more virtual premises ("Vp") gateway devices 405 (which might comprise a first through $N^{th}$ Vp gateway devices 405a-405n) and corresponding one or more virtual network ("Vn") gateway devices 410 (which might comprise a first through $N^{th}$ Vn gateway devices 410a-410n). System 400 might further comprise at least one network node 415, and the one or more Vn gateway devices 410 might be located at the at least one network node 415. Here, network node 415 might correspond to network node 225a or 225b of FIG. 2B or 2C, respectively. Similar to network node 225a or 225b as described above with respect to FIG. 2B or 2C, network node 415 might establish a connection between WAN 420 and each customer LAN 430 (here, shown as customer LAN 430a through customer LAN 430n, each corresponding to one of Vp gateway devices 405a through 405n) and/or might extend each customer LAN 430 (via the connection) to span between the network node 415 (which is a network service point) and each corresponding customer premises (e.g., customer premises 105 of FIGS. 1 and 2).

System 400 might further establish two or more isolated service overlays 425 within WAN 420 (or other service provider network 420). In the embodiment of FIG. 4, the two or more isolated service overlays 425 might include, without limitation, two or more of a secure data service overlay, an Internet service overlay, an Internet of Things ("IoT") service overlay, a programmable services backbone ("PSB") service overlay, a content delivery network ("CDN") service overlay, one or more application or app service overlays each associated with an application service provider, or one or more other service overlays each associated with a service provider. Each of the two or more isolated service overlays have network traffic that is isolated from network traffic transmitted along another of the two or more isolated service overlays. System 400 might further establish corresponding two or more isolated service overlays 435 within each customer LAN 430 (here, shown as two or more isolated service overlays 435a established within customer LAN 430a, two or more isolated service overlays 435n established within customer LAN 430n, and so on, with each set of service overlays 435a-435b and each customer LAN 430-430n corresponding to one of Vp gateway devices 405a through 405n). The network node 415 and/or each Vn gateway device 410a-410n routes and/or maps each of the two or more isolated service overlays 425 within WAN 420 with a corresponding one of the two or more isolated service overlays 435 for each customer LAN 430a-430n. In this manner, full isolation, security, privacy enforcement, placement of apps, data, and/or content in each or any overlay 425, and/or any combination of these functions may be achieved, for each customer at each customer premises.

With reference to FIG. 5, each Vn gateway device 410 might be embodied as a Vn gateway container 410 within network node 415. The Vn gateway container 410 might comprise a router/mapper function 505 (which might be a VNF or the like that is instantiated within the Vn gateway device 410 using at least one of a PSB virtual function, a SDN controller, a NFV entity, a VNF, and/or the like). In FIG. 5, the diamond-shaped icons, in some cases, represent gateway functions. In particular, the set of diamond-shaped icons between the WAN 420 and the Vn Gateway Container 410 each represents a gateway function that represents where (an overlay for) the WAN (or Internet) "stops"; all functions to the right of this set of diamond-shaped icons in FIG. 5 represent the "platform"-side of the service, with the Vn gateway being the edge of platform (in this sense). The router/mapper function 505 might have a WAN interface 510 that interfaces with WAN 420 and a LAN interface 515 that interfaces with LAN 435, including interfacing each of the two or more isolated service overlays 425 within WAN 420 and interfacing each of the two or more isolated service overlays 435 within each customer LAN 430. The router/mapper function 505 might further map each of the two or more isolated service overlays 425 (on the WAN-side) with each corresponding one of the two or more isolated service overlays 435 (on the LAN-side). For example, router/mapper function 505 might map secure data service overlay 425 of WAN 420 with secure data service overlay 435 of LAN 430, map Internet service overlay 425 of WAN 420 with Internet service overlay 435 of LAN 430, map IoT service overlay 425 of WAN 420 with IoT service overlay 435 of LAN 430, map PSB service overlay 425 of WAN 420 with PSB service overlay 435 of LAN 430, map CDN service overlay 425 of WAN 420 with CDN service overlay 435 of LAN 430, map one or more app service overlays 425 of WAN 420 with one or more app service overlays 435 of LAN 430, map one or more other service overlays 425 of WAN 420 with one or more other service overlays 435 of LAN 430, and so on.

In some embodiments, Vn gateway container 410 might further comprise one or more virtual application ("Vapp") containers 520, which, in some cases, might include, but are not limited to, at least one of one or more firewalls or firewall Vapp containers 520a, one or more Vapp containers 520b hosting one or more authentication, authorization, and accounting ("AAA") proxies 525, one or more containers 520c hosting one or more IoT servers 530, one or more CDN Vapp containers 520d, and/or the like. As shown in FIG. 5, the Internet data stream from the Internet service overlay 425 of WAN 420 might first be routed through a firewall Vapp container 520a (as indicated by a dashed line routing through firewall Vapp container 520a), prior to interfacing with the WAN interface of router/mapper function 505 and subsequently routing/mapping to the corresponding Internet service overlay 435 of customer LAN 430. Likewise, the IoT data stream from the IoT service overlay 425 of WAN 420 might first be routed through a IoT server 530 in container 520c (as indicated by a solid line routing through container 520c), prior to interfacing with the WAN interface of router/mapper function 505 and subsequently routing/mapping to the corresponding IoT service overlay 435 of customer LAN 430. Similarly, the PSB data stream from the PSB service overlay 425 of WAN 420 might first be routed through a AAA proxy 525 in Vapp container 520b (as indicated by a long dashed line routing through Vapp container 520b), prior to interfacing with the WAN interface of router/mapper function 505 and subsequently routing/mapping to the corresponding PSB service overlay 435 of customer LAN 430. In a similar manner, the CDN data stream from the CDN service overlay 425 of WAN 420 might first be routed through CDN Vapp container 520d (as indicated by a long dash/dash line routing through CDN Vapp container 520d), prior to interfacing with the WAN interface of router/mapper function 505 and subsequently routing/mapping to the corresponding CDN service overlay 435 of customer LAN 430.

If Internet protocol version 4 ("IPv4") is used, mapping between the WAN 420 (i.e., service provider network) and the customer LAN 430 might comprise mapping between the WAN 420 and the customer LAN 430 using network address translation ("NAT"), which remaps one IP address space into another by modifying network address information in IP datagram packet headers, while the IP datagram packets (whose headers are to be modified) are in transit across the router/mapper function 505 of the Vn gateway container 410. Alternatively, if Internet protocol version 6 ("IPv6") is used, mapping between the WAN 420 (i.e., service provider network) and the customer LAN 430 might comprise directly mapping between the WAN 420 (in some cases, VxLANs) and the customer LAN 430 for each of the service overlays 425/435. In some embodiments, the Vn gateway device 410 might essentially be a router or VxLAN mapper in a container that controls the mapping between the Internet (e.g., Internet 140 of FIGS. 1 and 2) or WAN 420 and the customer LAN 430. In some instances, the Vn gateway device 410 can add applications and services at any point (i.e., in any service overlay on the WAN-side and/or on the LAN-side) by modifying the mappings. According to some embodiments, the WAN comprises separated overlays that are treated via a border network gateway or broadband network gateway ("BNG") and/or gateway function as they are mapped into the LAN. On the LAN side, multiple methods and technologies—including, but not limited to, virtual private networks ("VPNs"), secure shell tunnels, and/or the like—may be utilized to transport the service, to extend the WAN overlay into the LAN.

In some embodiments, a "platform" feature (i.e., feature of the Vn gateway or the like) might include "fencing," which might refer to an isolated overlay (or a VPN, secure shell tunnel, VLAN, VXLAN, etc.) securing or "fencing off" access to something on the customer LAN so that it is protected and other flows or network traffic are "kept away" from it. For example, with IoT, it may be desired to have an IoT application communicate with a single IoT sensor, and not to just anything that is available on the Internet. In this case, a "who can access"—type list for the IoT overlay (or IoT VPN, IoT secure shell tunnel, IoT VLAN, IoT VXLAN, etc.) might be used when performing fencing for the IoT sensor. In some cases, an intrusion detection system ("IDS"), which is a device or software application that monitors network or system activities for malicious activities and that reports such activities, might be used in conjunction with the "fencing" feature to ensure that the IoT application is the only application that communicates with the particularly IoT sensor, otherwise reports and alarms might be triggered, by the IDS, indicating a system security breach or the like.

Although not specifically shown in the figures, components of the systems 400 and/or 500 may be wirelessly connected to other components in the respective system(s). For example, wireless speaker systems might communicatively couple to the CDN Vapp container 520d and the CDN overlay 425 via the CDN overlay 435. Alternatively, wireless backhaul might be used via the PSB overlay 425 and/or the PSB overlay 435.

Figure 6:
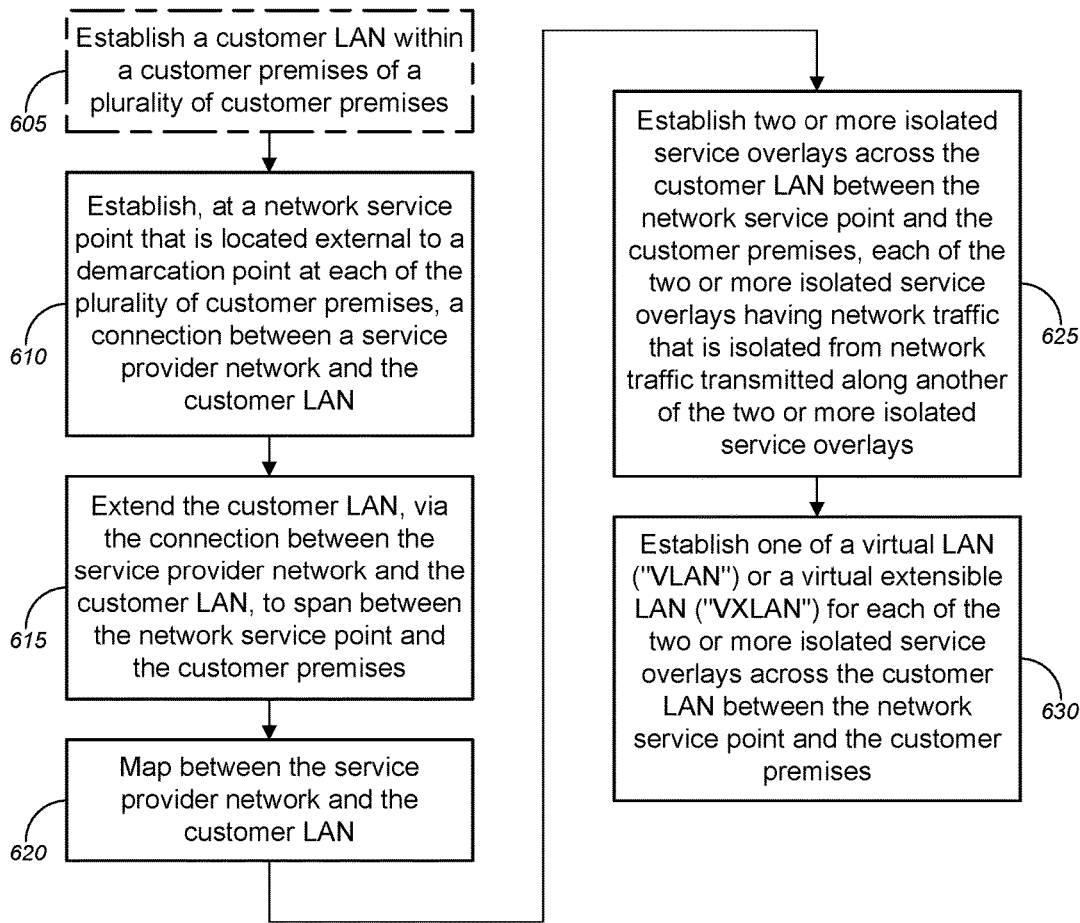
FIG. 6 is a flow diagram illustrating a method for implementing extension of a customer LAN at a provider network service point(s), in accordance with various embodiments.
Figure 7:
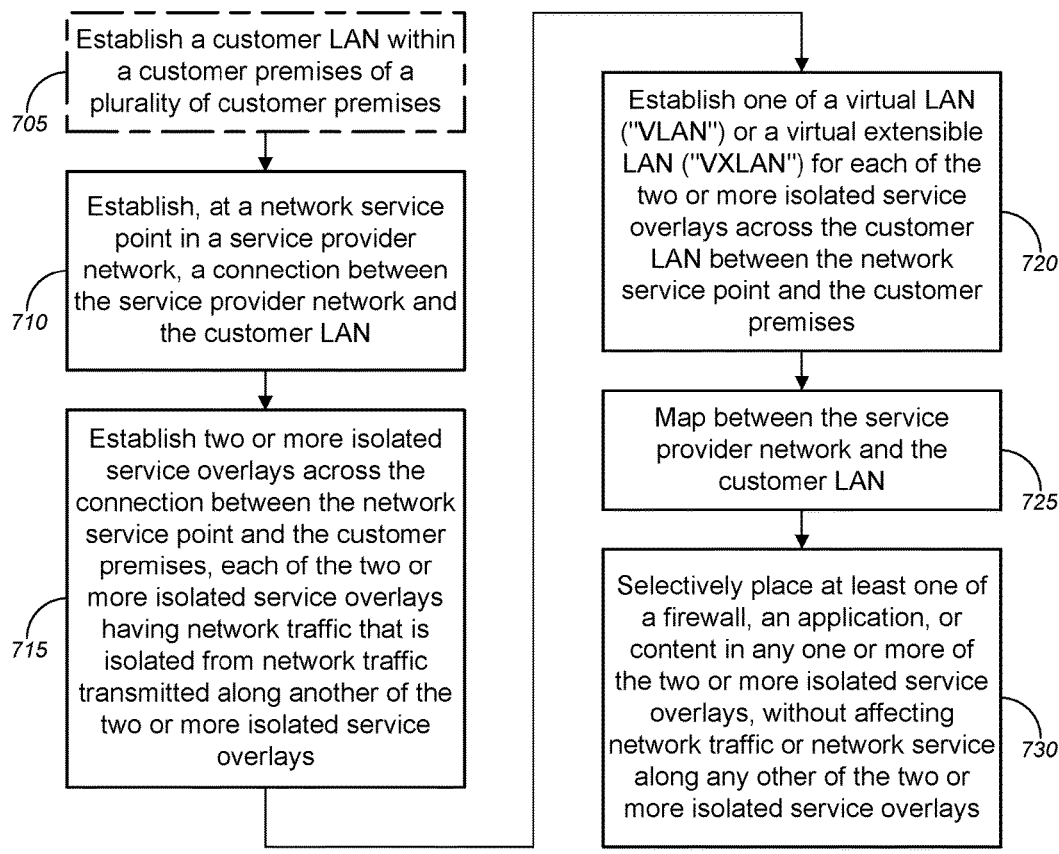
FIG. 7 is a flow diagram illustrating a method for implementing isolated service overlays between a provider network service point(s) and a customer premises, in accordance with various embodiments.

FIG. 6 is a flow diagram illustrating a method 600 for implementing extension of a customer LAN at a provider network service point(s), in accordance with various embodiments. While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems 100, 200', 200", 300, 400, and 500 of FIGS. 1, 2B, 2C, 3, 4, and 5 respectively (or components thereof), such methods may also be implemented using any suitable hardware (or software) implementation. Similarly, while each of the systems 100, 200', 200", 300, 400, and 500 of FIGS. 1, 2B, 2C, 3, 4, and 5, respectively (or components thereof), can operate according to the method 600 illustrated by FIG. 6 (e.g., by executing instructions embodied on a computer readable medium), the systems 100, 200', 200", 300, 400, and 500 of FIGS. 1, 2B, 2C, 3, 4, and 5 can each also operate according to other modes of operation and/or perform other suitable procedures.

In FIG. 6, method 600, at optional block 605, might comprise establishing a customer local area network ("LAN") within a customer premises of a plurality of customer premises. Alternatively, the customer LAN may already have been previously established at the customer premises.

At block 610, method 600 might comprise establishing, at a network service point (e.g., at network node 225a located at a digital subscriber line access multiplexer ("DSLAM") or optical line terminal ("OLT") 135 in FIG. 2B, at network node 225b located at a central office 125 in FIG. 2C, or the like), a connection between a service provider network and the customer LAN (e.g., a connection between wide area network ("WAN") 215 and customer LAN 210 of FIG. 2, a connection between WAN 420 and customer LAN 430 of FIGS. 4 and 5, or the like). The network service point, in some cases, is located external to a demarcation point (e.g., demarcation point 120 of FIG. 1, demarcation point 220a of FIG. 2, demarcation point 320 of FIG. 3, or the like) at each of the plurality of customer premises (e.g., customer premises 105 of FIGS. 1 and 2, customer premises 305 of FIG. 3, or the like). In some embodiments, the network service point might be located at one of a central office or a DSLAM, and/or the like. Alternatively, or additionally, the network service point might be located at one of an OLT, a network access point ("NAP"), a network interface device ("NID"), or an enhanced NID ("eNID"), and/or the like, each of which might be located on a network-side relative to the demarcation point. In some instances, the service provider network is a WAN.

Method 600 might further comprise extending the customer LAN, via the connection between the service provider network and the customer LAN, to span between the network service point and the customer premises (block 615). According to some embodiments, extending the customer LAN to span between the network service point and the customer premises might comprise extending the customer LAN to span between the network service point and the customer premises by utilizing one or more of network functions virtualization ("NFV") or software-defined networks ("SDNs"), and/or the like.

Method 600, at block 620, might comprise mapping between the service provider network and the customer LAN (i.e., mapping one network to the other, and/or vice versa). In some embodiments, mapping between the service provider network and the customer LAN might comprise mapping between the service provider network and the customer LAN, via at least one of a router function, a mapper function, a programmable services backbone ("PSB") function, a NFV function, or a SDN function, and/or the like.

At block 625, method 600 might further comprise establishing two or more isolated service overlays (e.g., isolated service overlays 435 of FIGS. 4 and 5, or the like) across the customer LAN (e.g., customer LAN 430 of FIGS. 4 and 5, or the like) between the network service point (e.g., at network node 225a located at a DSLAM or OLT 135 in FIG. 2B, at network node 225b located at a central office 125 in FIG. 2C, at a network node 415 in FIG. 4, at a virtual network gateway or gateway container 410 in FIG. 5, or the like) and the customer premises (e.g., customer premises 105 of FIGS. 1 and 2, customer premises 305 of FIG. 3, or the like), each of the two or more isolated service overlays having network traffic that is isolated from network traffic transmitted along another of the two or more isolated service overlays. Merely by way of example, according to some embodiments, the two or more isolated service overlays might include, without limitation, two or more of a secure data service overlay, an Internet service overlay, an Internet of Things ("IoT") service overlay, a PSB service overlay, a content delivery network ("CDN") service overlay, one or more application or app service overlays each associated with an application service provider, or one or more other service overlays each associated with a service provider, and/or the like.

In some embodiments, establishing the two or more isolated service overlays across the customer LAN between the network service point and the customer premises might comprise establishing one of a virtual LAN ("VLAN") or a virtual extensible LAN ("VXLAN") for each of the two or more isolated service overlays across the customer LAN between the network service point and the customer premises (block 630).

FIG. 7 is a flow diagram illustrating a method 700 for implementing isolated service overlays between a provider network service point(s) and a customer premises, in accordance with various embodiments. While the techniques and procedures are depicted and/or described in a certain order for purposes of illustration, it should be appreciated that certain procedures may be reordered and/or omitted within the scope of various embodiments. Moreover, while the method 700 illustrated by FIG. 7 can be implemented by or with (and, in some cases, are described below with respect to) the systems 100, 200, 200', 200", 300, 400, and 500 of FIGS. 1, 2A, 2B, 2C, 3, 4, and 5, respectively (or components thereof), such methods may also be implemented using any suitable hardware (or software) implementation. Similarly, while each of the systems 100, 200, 200', 200", 300, 400, and 500 of FIGS. 1, 2A, 2B, 2C, 3, 4, and 5, respectively (or components thereof), can operate according to the method 700 illustrated by FIG. 7 (e.g., by executing instructions embodied on a computer readable medium), the systems 100, 200, 200', 200", 300, 400, and 500 of FIGS. 1, 2A, 2B, 2C, 3, 4, and 5 can each also operate according to other modes of operation and/or perform other suitable procedures.

In FIG. 7, method 700, at optional block 705, might comprise establishing a customer local area network ("LAN") within a customer premises of a plurality of customer premises. Alternatively, the customer LAN may already have been previously established at the customer premises.

At block 710, method 700 might comprise establishing, at a network service point, a connection between the service provider network and the customer LAN (e.g., a connection between WAN 215 and customer LAN 210 of FIG. 2, a connection between WAN 420 and customer LAN 430 of FIGS. 4 and 5, or the like). The network service point, in some cases, might be located at network node 225a that is located at a digital subscriber line access multiplexer ("DSLAM") or optical line terminal ("OLT") 135 in FIG. 2B, at network node 225b that is located at a central office 125 in FIG. 2C, or in a service provider network (e.g., wide area network ("WAN") 215 of FIG. 2, WAN 420 of FIGS. 4 and 5, or the like), and/or the like. In some embodiments, the network service point might be located at one of an edge switch, a central office, or a DSLAM, and/or the like. Alternatively, or additionally, the network service point might be located at one of an OLT, a network access point ("NAP"), a network interface device ("NID"), or an enhanced NID ("eNID"), and/or the like, each of which might be located near or within the customer premises. In some instances, the service provider network is a WAN.

According to some embodiments, establishing the connection between the service provider network and the customer LAN might comprise one of establishing a wireless connection between the service provider network and the customer LAN, establishing a wired connection between the service provider network and the customer LAN, establishing a hybrid wireless/wired connection between the service provider network and the customer LAN, or establishing a backup connection between the service provider network and the customer LAN, and/or the like.

Method 700 might further comprise, at block 715, establishing two or more isolated service overlays (e.g., isolated service overlays 435 of FIGS. 4 and 5, or the like) across the connection between the network service point (e.g., at network node 225a located at a DSLAM or OLT 135 in FIG. 2B, at network node 225b located at a central office 125 in FIG. 2C, at a network node 415 in FIG. 4, at a virtual network gateway or gateway container 410 in FIG. 5, or the like) and the customer premises (e.g., customer premises 105 of FIGS. 1 and 2, customer premises 305 of FIG. 3, or the like), each of the two or more isolated service overlays having network traffic that is isolated from network traffic transmitted along another of the two or more isolated service overlays. Merely by way of example, according to some embodiments, the two or more isolated service overlays might include, without limitation, two or more of a secure data service overlay, an Internet service overlay, an Internet of Things ("IoT") service overlay, a PSB service overlay, a content delivery network ("CDN") service overlay, one or more application or app service overlays each associated with an application service provider, or one or more other service overlays each associated with a service provider, and/or the like.

In some embodiments, establishing the two or more isolated service overlays across the customer LAN between the network service point and the customer premises might comprise establishing one of a virtual LAN ("VLAN") or a virtual extensible LAN ("VXLAN") for each of the two or more isolated service overlays across the customer LAN between the network service point and the customer premises (block 720).

Method 700, at block 725, might comprise mapping between the service provider network and the customer LAN (i.e., mapping one network to the other, and/or vice versa). In some embodiments, mapping between the service provider network and the customer LAN for each of the two or more isolated service overlays might comprise mapping between the service provider network and the customer LAN for each of the two or more isolated service overlays, via at least one of a router function, a mapper function, a programmable services backbone ("PSB") function, a NFV function, or a SDN function, and/or the like.

Method 700 might further comprise selectively placing at least one of a firewall, an application, or content, and/or the like, in any one or more of the two or more isolated service overlays, without affecting network traffic or network service along any other of the two or more isolated service overlays (block 730).

FIGS. 8A-12 are directed to implementing network enhanced gateway functionality, which is described in detail in the '023700US application (which has already been incorporated herein by reference in its entirety). The network enhanced gateway functionality or a network enhanced gateway device (which implements such functionality) can be used at the customer premises, and might correspond to one or more of gateway 110 and/or NID 115 of FIG. 1, gateway 205 of FIG. 2, gateway 310 and/or NID 315 of FIG. 3, virtual premises ("Vp") gateway 405 of FIG. 4, and/or the like, as described in detail above. Alternatively, or additionally, the network enhanced gateway functionality or the network enhanced gateway device (which implements such functionality), can be used at a network service point, and might correspond to one or more of PSB node(s) 130 and/or DSLAM/OLT 135a/135b of FIG. 1, network node 225a and/or 225b of FIG. 2, DSLAM/OLT 335 of FIG. 3, network node 415 and/or virtual network ("Vn") gateway(s) 410 of FIG. 4, Vn gateway container 410 of FIG. 5, and/or the like, as described in detail above.

Figure 8A:
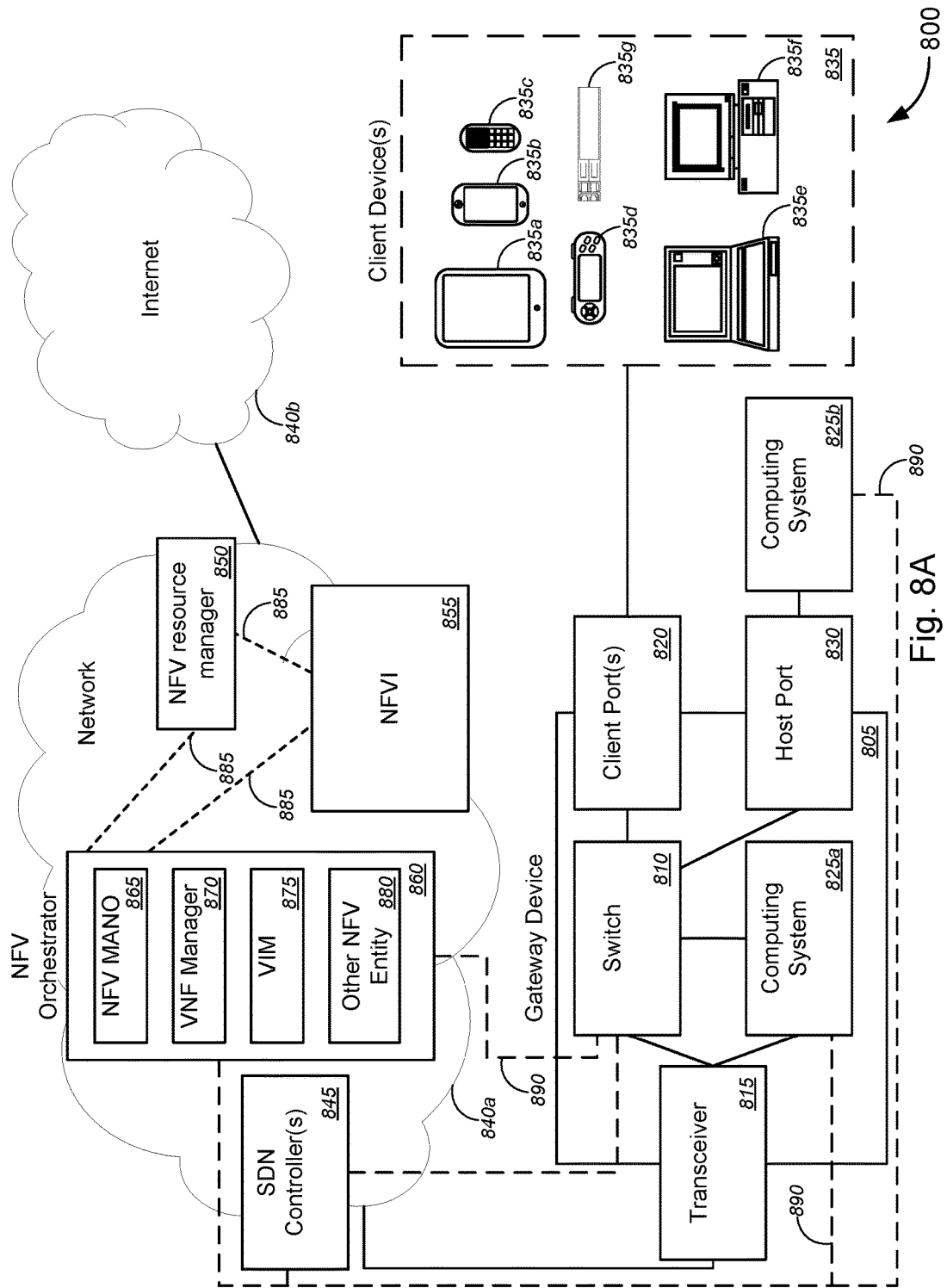
FIG. 8A is a schematic diagram illustrating a system for implementing network enhanced gateway functionality, in accordance with various embodiments.

With reference to the figures, FIG. 8A is a schematic diagram illustrating a system 800 for implementing network enhanced gateway functionality, in accordance with various embodiments. In FIG. 8A, system 800 might comprise a gateway device 805, which might include, without limitation, a switch 810, at least one transceiver 815, and one or more client ports 820, and/or the like. In some cases, the gateway device 805 might further comprise one or more computing systems 825a. Alternatively, or additionally, the gateway device 805 might further comprise one or more host ports 830, each communicatively coupled to one or more external computing systems 825b. The one or more computing systems 825a and the one or more external computing systems 825b are collectively referred to herein as "computing systems 825" or "host computing systems 825."

In some embodiments, the host computing systems 825 might each comprise at least one of an x86 host computing device or an advanced reduced instruction set computer ("RISC") machine ("ARM") computing device, and/or the like. In some cases, the host computing systems 825 might each comprise one or more computing cores, preferably two or more computing cores. In some instances, at least one first computing core might perform functions of a gateway device, while at least one second computing core might perform hypervisor functions to support virtual network functions ("VNFs"). In some embodiments, supporting VNFs might include, without limitation, at least one of generating VNFs, configuring VNFs, instantiating VNFs, modifying VNFs, sending VNFs to particular network and/or computing locations, bursting VNFs in particular network and/or computing locations, removing VNFs from particular network and/or computing locations, replacing VNFs, providing complementary other VNFs to complement or supplement functions of the VNF, and/or the like.

Figure 9:
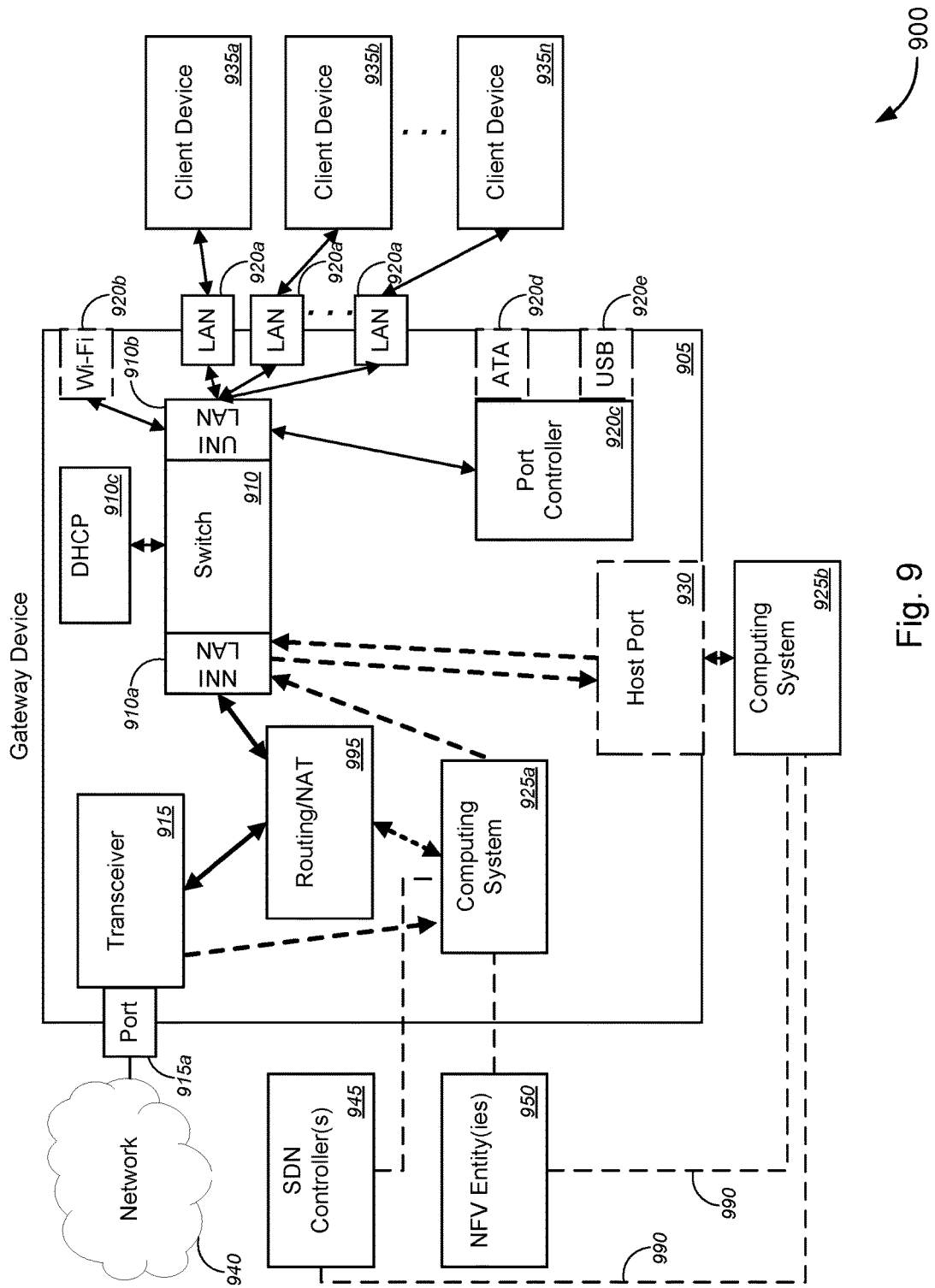
FIG. 9 is a schematic diagram illustrating another system for implementing network enhanced gateway functionality, in accordance with various embodiments.
Figure 10:
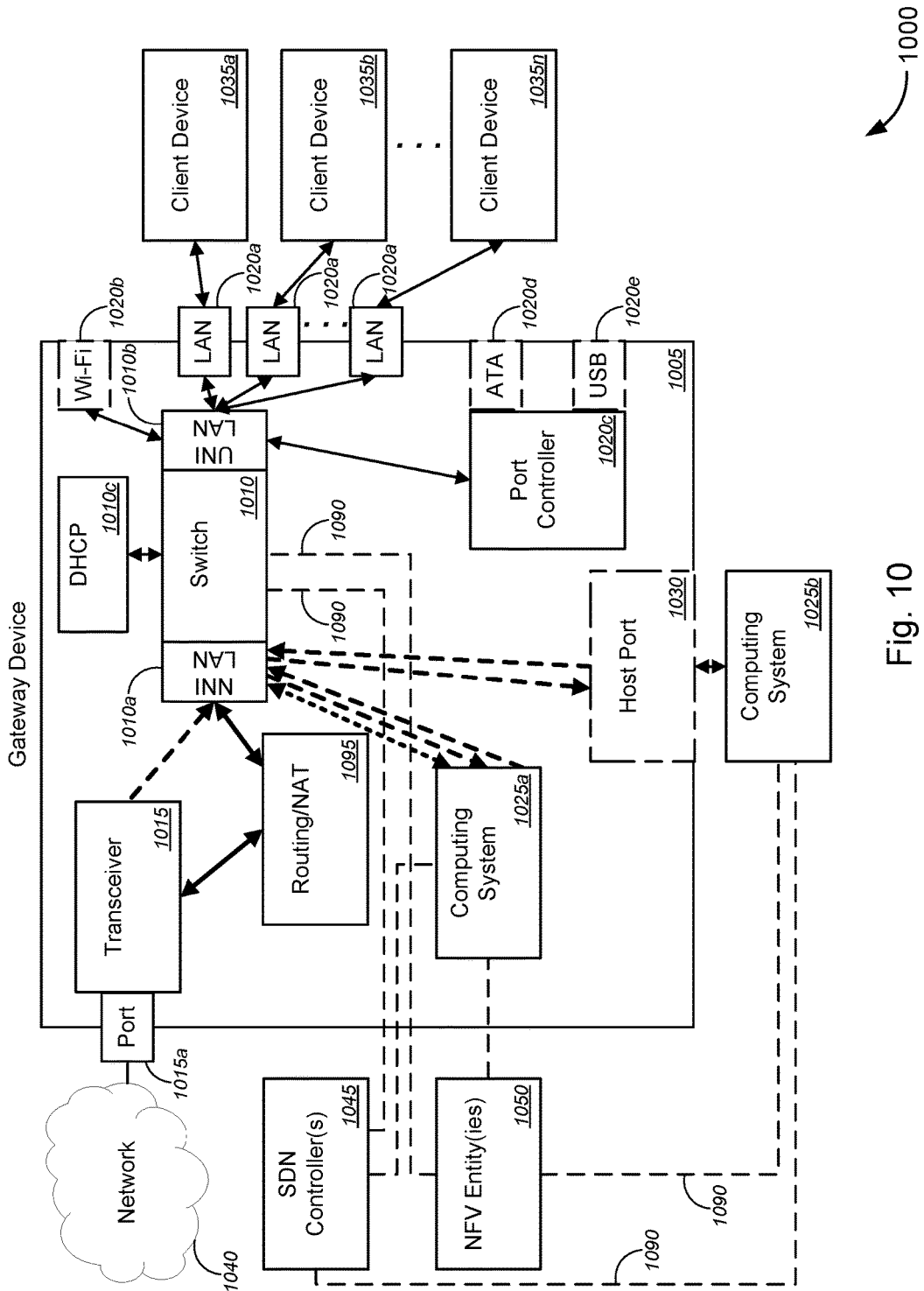
FIG. 10 is a schematic diagram illustrating yet another system for implementing network enhanced gateway functionality, in accordance with various embodiments.
Figure 11:
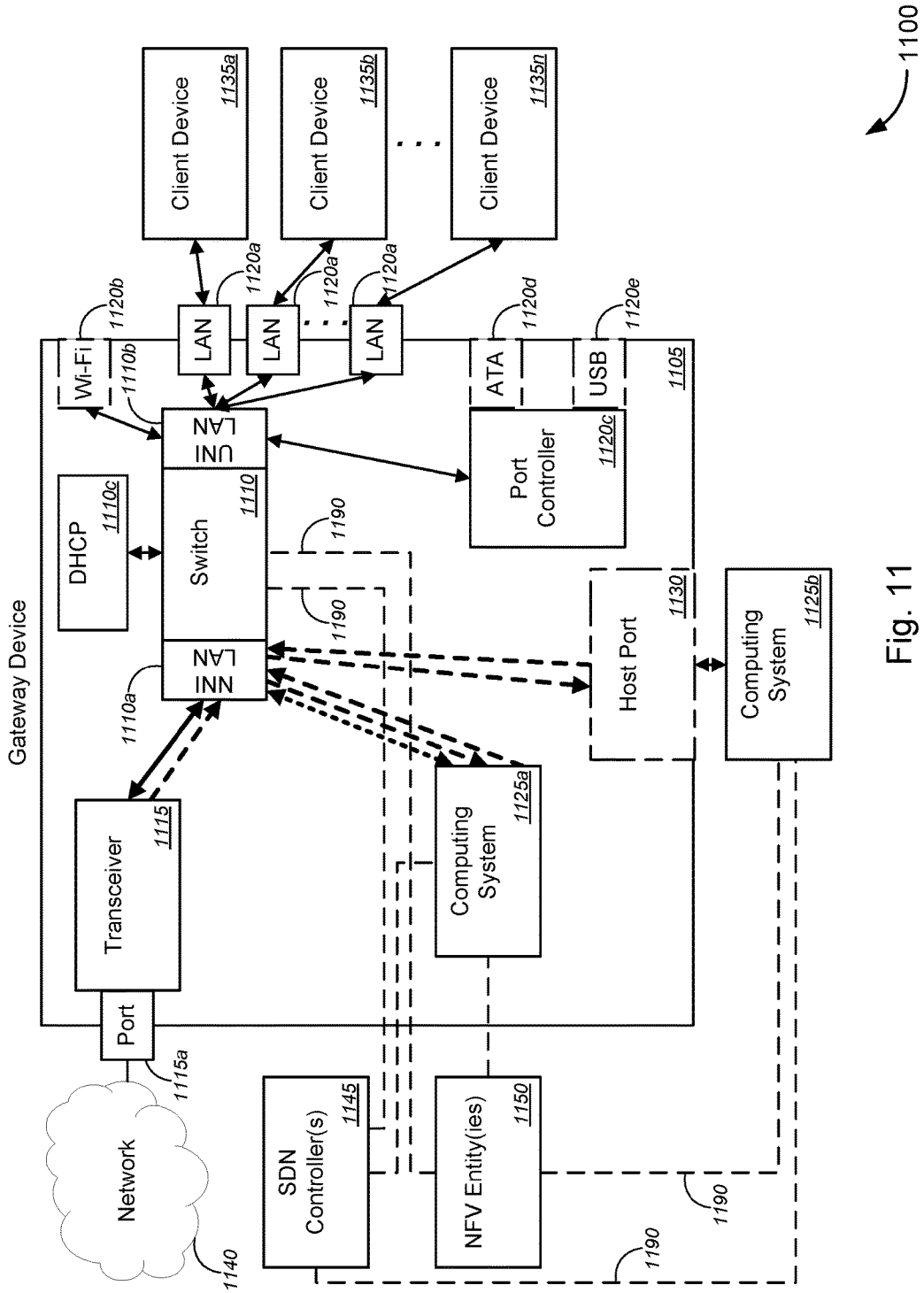
FIG. 11 is a schematic diagram illustrating still another system for implementing network enhanced gateway functionality, in accordance with various embodiments.

According to some embodiments, the switch 810 might communicatively couple to two or more of the following components: the at least one transceiver 815, the one or more client ports 820, the one or more computing systems 825a, and/or the one or more host ports 830, and/or the like. In some cases, the transceiver 815 might directly couple with the one or more computing systems 825a. In some embodiments, each of the plurality of client ports 820 might comprise one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port, and/or the like. In some cases, the network switch 810 might be an Ethernet switch or a LAN switch that connects one or more LAN segments (typically, but not limited to, one of WiFi and one for the physical LAN ports, and/or the like). In some embodiments, the network switch 810 can be a physical switch or a virtual switch. In some cases, the network switch 810 might be a virtual network switch that utilizes a network switch VNF to provide network switching functionality. According to some embodiments, gateway device 805 might comprise a dynamic host configuration protocol ("DHCP"), which is a client/server protocol that automatically assigns Internet Protocol ("IP") addresses for the LAN so that computing and/or client devices can communicate. The DHCP (which is depicted in FIGS. 9-11 as DHCP 910c, 1010c, and 1110c, respectively) is a function that can be embodied as a physical component or as a virtual one; in some cases, a DHCP might be a virtual DHCP that utilizes a DHCP VNF to provide DHCP functionality. In some instances, the transceiver 815 might be a virtual transceiver that utilizes a transceiver VNF to provide transceiver functionality.

In some embodiments, system 800 might further comprise one or more client devices 835 that may be communicatively coupled to switch 810 each via a corresponding client port of the one or more client ports 820. The one or more client devices 835, according to some embodiments, might include, without limitation, a user device including, but not limited to, one of a tablet computer 835a, a smart phone 835b, a mobile phone 835c, a portable gaming device 835d, a laptop computer 835e, or a desktop computer 835f, and/or the like. In some instances, the client device 835 might comprise a device 835g, including, without limitation, a small form factor pluggable ("SFP") device, an enhanced SFP ("SFP+") device, a compact SFP ("CSFP") device, a gigabit interface converter ("GBIC"), a universal serial bus ("USB") pluggable device, and/or the like. At least one of the SFP device, the SFP+ device, or the CSFP device might comprise at least one of a SFP network interface device ("NID"), a SFP router, a SFP modem, or a SFP wireless access point, and/or the like. The USB pluggable device might comprise one of a printer, a scanner, a combination printer/scanner device, an external hard drive, a camera, a keyboard, a mouse, a drawing interface device, or a mobile device, and/or the like. For each of these client devices 835, a corresponding or compatible one or more of the above-mentioned client ports 820 would serve as an interface(s) between the particular client device 835 (or type of client device) and the network switch 810.

In some cases, system 800 might further comprise network 840a, which might communicatively couple to the gateway device 805 via the at least one transceiver 815, and might also communicatively couple to the Internet 840b. System 800 might further comprise one or more network functions virtualization ("NFV") entities and/or a software defined network ("SDN") controller 845. In some embodiments, the one or more NFV entities might include, but are not limited to, at least one of a NFV resource manager 850, a network functions virtualization infrastructure ("NFVI") system 855, a NFV orchestrator 860, a NFV management and orchestration ("MANO") system 865, a VNF manager 870, a virtualized infrastructure manager ("VIM") 875, and/or other NFV entities 880, and/or the like. In some cases, the other NFV entities 880 might include, without limitation, a virtual machine ("VM"), a macro orchestrator, or a domain orchestrator, and/or the like. As shown in FIG. 8A, multiple NFV entities might communicatively couple with each other (as depicted by dash lines 885 interconnecting the NFV resource manager 850, the NFVI 855, and the NFV orchestrator 860 in FIG. 8).

Although FIG. 8A depicts the one or more NFV entity(ies) 850-880 as being located in the network 840a, the various embodiments are not so limited, and the one or more NFV entity(ies) 850-880 may be located in a network (such as network 840a or the like), located in the gateway device 805, or distributed between both the network and the gateway device 805, and/or the like. For example, in some embodiments, the host computing system might host an instantiated network functions virtualization infrastructure ("NFVI") system. In some instances, the computing system 825 might register with the NFV orchestrator 860 (or other NFV entity) so that its capabilities are known to the NFV orchestrator 860 (or other NFV entity) and/or to the VIM 875. According to some embodiments, the network switch 810 and the computing system 825 are under control of at least one of the one or more NFV entities and/or the SDN controller 845 (as indicated by the long-dash lines denoted 890 in FIG. 8A). For SDN control, the SDN controller 845 might utilize a communications protocol, such as OpenFlow or other protocol, or the like, that gives access to the forwarding plane of a network switch or router over a network.

In some instances, at least one of the SFP device, the SFP+ device, or the CSFP device (collectively, "SFPs") might be used at not only the client side (as described above), but also at the network side, in which case, the SFPs might interface with corresponding ports in the transceiver, to handle communications or data to or from the network 840a. In some cases, on the network side, the SFPs might terminate a direct fiber or a passive optical network ("PON"), which would be at the physical layer of the network. On the client side, the SFPs can be used to connect the physical layer terminating device to the gateway device. In some embodiments, an SFP can also be used in a similar way as a USB port.

Merely by way of example, according to some embodiments, the gateway device 805 might include, without limitation, one of a customer premises equipment ("CPE"), a router, a switch, a network element, a demarcation device, a WiFi gateway device, a hypervisor platform, one or more virtual machine-based host machines, and/or the like. In some embodiments, the one or more virtual machine-based host machines might include, without limitation, a kernel-based virtual machine ("KVM")-based host machine, an ESX-based host machine, an ESXi-based host machine, and/or the like. In some instances, the CPE might include, but is not limited to, at least one of an optical network terminal ("ONT"), a network interface device ("NID"), an enhanced NID ("eNID"), a residential gateway ("RG") device, a business gateway ("BG") device, or a virtual gateway ("vG") device (which could be a vRG, a vBG, or other virtual gateway, and the like). In such cases, the gateway device might be located at or near a customer premises associated with a user of the client device. The NID, in some instances, might be a fiber-fed terminating device, a copper-fed terminating device, or a combination fiber-fed and copper-fed terminating device, and the like. In some embodiments, the gateway device 805 might be an integrated device that terminates the physical layer access line and the gateway (e.g., RG, BG, vG, etc.) in one container or box. In some cases, the gateway device 805 and/or the one or more computing systems 825 might include, without limitation, a VMware Host (which, in some instances, might comprise a bare metal/plastic host or a compute bus on a node, and the like) or a Linux container (as Linux has the ability to create a "virtual host" or soft host as part of the entire NID operating system).

In some cases, the transceiver 815 might comprise a network port (e.g., port 915*a*, 1015*a*, or 1115*a*, as shown in FIGS. 9-11, respectively, or the like). In some embodiments, the network port might include, without limitation, a SFP port to which an ONT SFP or a digital subscriber line ("DSL") Modem SFP might interface, connect, or couple. In such embodiments, the DSL Modem SFP might terminate the physical DSL technologies (sometimes referred to generally as "xDSL") line or the like. In other embodiments, the ONT SFP might terminate the physical passive optical network or direct point-to-point technologies. Other types of SFP transceivers might also comprise a specific type of transceivers for, but not limited to, wireless transceivers like LTE transceivers, 5G transceivers, and/or the like, or even cable modem transceivers. In some cases, the network port might include at least one of one or more optical SFP ports to which fiber cables can connect with corresponding optical SFP ports on an external ONT, one or more copper cable-based SFP ports to which copper cables can connect with corresponding copper cable-based SFP ports on the external ONT, one or more RJ-45 ports to which copper RJ-45 cables can connect with corresponding RJ-45 ports on the external ONT, and/or the like.

Merely by way of example, in some embodiments, the client ports 820 might each be a very high speed port that can handle traffic from multiple client devices 835, and in fact has to be fast enough in terms of network speed to handle all traffic from the network port (e.g., network DSL port, PON port, or the like), through the external host computing system 825*b*, via the gateway device 805, and to the client devices 835, and vice versa. For similar reasons, the host port 830 is, in some embodiments, a very high speed port that handles traffic to and from the external host computing system 825*b*.

In operation, the network switch 810, which is disposed within the gateway device 805, might route network traffic to a host computing system 825, at least a portion of the network traffic being originally directed to a client device 835 via the network switch 810 and via a corresponding client port 820 among a plurality of client ports 820. Based at least in part on one or more characteristics of the at least a portion of the network traffic that is directed to the client device 835, the host computing system 825 selects one or more VNFs. In some embodiments, the NFV orchestrator 860 or other NFV entity 850-880 might send the selected one or more VNFs to the host computing system 825, via the network switch 810. Alternatively, or additionally, for client devices 835 that are NFV-capable (including, but not limited to, set-top boxes, local Internet of Things ("IoT") controllers, IoT endpoints, and/or the like), the host computing system 825 might send one or more second VNFs (which might be based on the selected one or more VNFs or might be the same as the selected one or more VNFs) to the client devices 835—or otherwise provides the client devices 835 with access to the one or more VNFs—via the network switch 810 and corresponding client port 820. In some cases, the one or more characteristics of the received network traffic might comprise at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions, and/or the like.

According to some embodiments, as described above, the network switch 810 and the host computing system 825 are under control of a NFV entity 850-880 and/or a SDN controller 845, which provide network enhanced gateway functionalities to the gateway device, as described herein. The network traffic between the network switch 810 and the host computing system 825, in some embodiments, is at least one of uni-directional network traffic, bi-directional network traffic, or split directional network traffic that originates from at least one of one or more of the plurality of client ports 820 or one or more network ports (which might couple with the transceiver 815). For example, the network traffic might be sent in a uni-directional manner from the network side (i.e., from network 840*a* and received by transceiver 815) to the client side (i.e., to the client device(s) 835 via client port 820), or vice versa. Alternatively, or additionally, the network traffic might be sent bi-directionally, with some portion of the network traffic flowing from the network side to the client side, and some other portion of the network traffic flowing from the client side to the network side. Alternatively, or additionally, the network traffic might be sent in a split directional manner, in which the network traffic (or a portion thereof) is replicated and directed to more than one destination (where the destination can be at the network side or the client side). The network traffic can originate from either or both of the network side or the client side. In a particular embodiment (or set of embodiments), depending on the VNF being instantiated on the host computing system 825, the network traffic can be flowing to/from the network 840*a* and/or to/from the gateway device 805, and/or to/from the client device(s) 835. For example, a VNF could be a parental control function that blocks certain traffic from coming into the gateway device 805 from the network 840*a*. Another VNF may prioritize traffic in either direction. And so on. According to some embodiments, the functions of the network switch 810 can be enabled or disabled by the NFV orchestrator 860 (or other NFV entity). If the functions of the network switch 810 is disabled, the gateway device would function as a traditional or legacy gateway without the ability to run VNFs on the host computing system 825*a* and/or 825*b*. In other cases, a subscriber-side configuration portal or similar methods may allow a subscriber to disable the functions of the network switch and to cause the gateway device 805 to function in traditional or legacy mode. Likewise, the subscriber-side configuration portal or similar methods may allow the subscriber to enable the functions of the network switch 810 such that the gateway device 805 is able to run VNFs on the host computing system 825*a* and/or 825*b*.

Merely by way of example, in some embodiments, a customer can load a VNF onto the host compute platform of the computing system 825 or download the VNF from the network 840*a*. Alternatively, or additionally, a customer might be provided with access to the VNFs that may exist in the network that he or she is connected to or even third party networks that the customer may have IP connectivity to. For example, a customer may want filtering to occur in the network before network traffic hits his or her access line, to conserve bandwidth on his or her access line, and then execute a local VNF once the filtered traffic traverses the access line. In certain embodiments, the customer might want to service chain VNFs on the gateway device 805 with other VNFs that exist on the network. Here, "service chain" or "service chaining" might refer to implementing two or more VNFs to perform a particular function. In such embodiments, it may first be determined whether service chaining is required (e.g., if only one VNF is required, no service chaining is necessary) and, if so, the system (e.g., one or more of the NFV entities 850-880) might determine whether it is possible to service chain two or more VNFs together to provide a single network service—including, without limitation, identifying and locating each individual VNF to provide sub-functionalities of the desired network service, managing the VNFs so that they can be service chained together, and/or the like. Based on a determination that service chaining is required and that two or more VNFs can be service chained together to provide a single network service, the two or more VNFs may be service chained together to provide a single network service. In one non-limiting example, four or five VNFs (regardless of which NFV entity each VNF is provided from) might be service chained together to perform the functions of a network router. In similar fashion, any number of VNFs (from any combination of NFV entities) may be service chained to perform any desired or ordered function. Service chaining and the processes outlined above related to service chaining are described in greater detail in the '208, '280, and '309 applications, which have already been incorporated herein by reference in their entirety.

According to some embodiments, as described above, the NFV entity might be located in either the network side (e.g., in network 840*a*, as shown in FIG. 8A), in the gateway device 805 (not shown in FIG. 8A), or both (also not shown in FIG. 8A). For instance, a customer might want to control his or her devices directly, in which case, a portal in the network might be provided to the customer to access. This would mean that the request would go to the network where the VNF controller might act upon the request and might configure VNFs that are local to the gateway device 805. Alternatively, or additionally, the customer might be provided with tools to configure his or her local VNFs directly without having to go through a network portal. In one set of examples, a VNF that is a virtual instantiation of a microprocessor or micro-compute resource (such as a Raspberry PI or other similar compute resource, or the like) might provide such functionality, and can be loaded and/or configured by the customer when not connected to the network.

The gateway device 805, as described above, is capable of operating on its own, with the network switch 810 serving to provide the in-premises connectivity among computing and/or user devices in the customer premises (i.e., with the network switch 810 serving as a LAN switch or the like). In some embodiments, large switch connections (e.g., wide area network ("WAN")—like connections), uplink type connections, and/or the like, can be added to the network switch 810 to act as a service point on the local device (i.e., the gateway device 805). In some cases, the gateway device 805 can be embodied by a set-top box or the like (or a set-top box can be a client device that couples to the gateway device 805 via a client port 820), and the large switch connections can feed all client devices 835 that are communicatively coupled to the gateway device 805 (or set-top box) via the client ports 820, while providing sufficient, ample, or excess bandwidth, or the like.

Figure 8B:
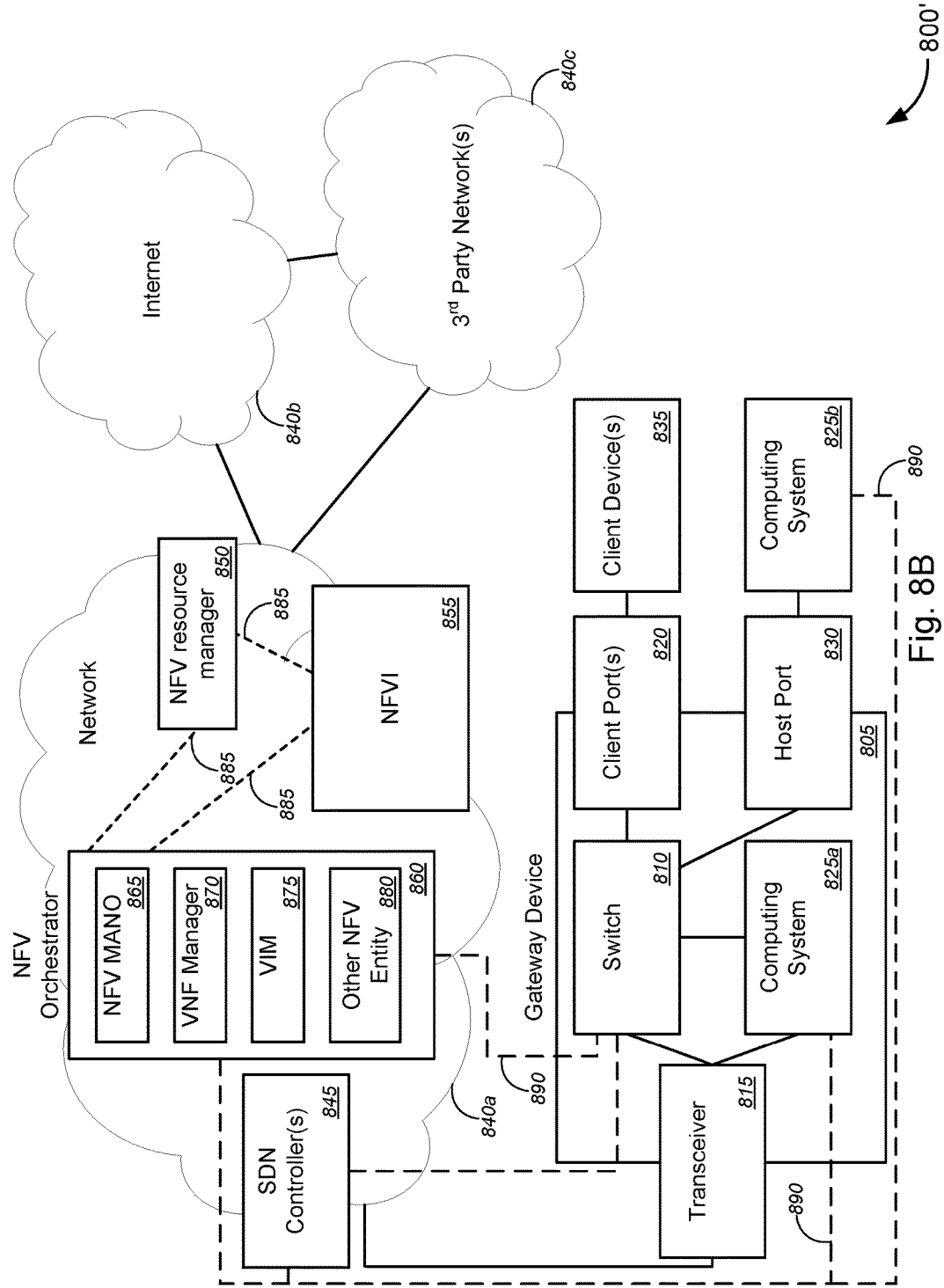
FIG. 8B is a schematic diagram illustrating an alternative system for implementing network enhanced gateway functionality, in accordance with various embodiments.

FIG. 8B is a schematic diagram illustrating an alternative system 800' for implementing network enhanced gateway functionality, in accordance with various embodiments. FIGS. 8A and 8B are collectively referred to as "FIG. 8." The embodiment of FIG. 8B is similar or identical to that of FIG. 8A, except that system 800' of FIG. 8B further comprises one or more third party networks 840*c*, which is communicatively coupled to one or both of network 840*a* and the Internet 840*b*. Each of the one or more third party networks 840*c* is associated with (i.e., controlled, operated, or owned by) a third party service provider that is different or separate from the service provider associated with the network 840*a*. In some embodiments, at least one third party network 840*a* might replicate, host, or instantiate content (i.e., data content, media content, VNFs, etc.) that are provided by either network 840*a* and/or the Internet 840*b*. In this manner, the network enhanced gateway device 805 may be serviced (in accordance with the embodiments as described above with respect to FIG. 8 and/or the embodiments as described below with respect to FIGS. 9-12) by network services that can be instantiated on either a private cloud or a public cloud by either the service provider associated with network 840*a* or a third party service provider associated with at least one of the third party networks 840*c*. In other words, a customer can subscribe to services offered by either the service provider associated with the network 840*a* or one or more third party service providers associated with the third party network 840*c*, or both. Network traffic can be separated between the multiple networks 840 via virtual private networks ("VPNs") or other network routing mechanisms. In some instances, at least one of the third party networks 840*c* might be geographically separate from the network 840*a* (e.g., in a different part of the same country, in different countries in the same continent, or in different countries in different continents, etc.). In such cases, the third party networks 840*c* might allow functionalities of the network 840*a* (particularly, with respect to implementation of network enhanced gateway functionality) to be made portable should a customer choose to bring his or her network enhanced gateway device abroad, for example.

The embodiment of system 800' of FIG. 8B would otherwise function in a similar, if not identical, manner as that of system 800 of FIG. 8A, the descriptions of the various components and functionalities of system 800 would be applicable to the descriptions of the various components and functionalities of system 800' of FIG. 8B.

FIGS. 9-11 depict various embodiments of systems for implementing network enhanced gateway functionality. FIG. 9 is a schematic diagram illustrating a system 900 for implementing network enhanced gateway functionality, in accordance with various embodiments. In some embodiments, system 900 might provide static host connectivity. FIG. 10 is a schematic diagram illustrating a system 1000 for implementing network enhanced gateway functionality, in accordance with various embodiments. In some embodiments, system 1000 might be service-chaining-host-capable. FIG. 11 is a schematic diagram illustrating a system 1100 for implementing network enhanced gateway functionality, in accordance with various embodiments. In some embodiments, system 1100, as configured, may be used to provide network enhanced gateway functionality, while allowing for flexible implementation, and thus, in some cases, may be implemented by service providers as a "standard" type of node or platform.

Turning to FIG. 9, system 900, according to some embodiments, might comprise gateway device 905, which comprises network switch 910, transceiver 915, a plurality of client ports 920, one or more computing systems 925a, a host port(s) 930 communicatively coupled to one or more external computing systems 925b, and a routing/network access translation ("NAT") device 995, and/or the like. The network switch 910, in some embodiments, might comprise a network-to-network interface ("NNI") or NNI LAN 910a, a user network interface ("UNI") or UNI LAN 910b, and a dynamic host configuration protocol ("DHCP") device 910c. In some cases, the network switch 910, as well as each of the NNI or NNI LAN 910a, the UNI or UNI LAN 910b, and the DHCP 910c, might be virtual components that utilize VNFs or the like to provide the network switch functionality, as well as the NNI or NNI LAN functionality, the UNI or UNI LAN functionality, and the DHCP functionality.

In some embodiments, the transceiver 915 might comprise a network port 915a, which (as described above) might provide physical port connections. In some cases, the transceiver 915 might be a virtual component that utilizes VNFs or the like to provide transceiver functionality. The plurality of client ports, in some instances, might comprise at least one of one or more LAN ports 920a, one or more Wi-Fi ports 920b, one or more port controllers 920c, one or more advanced technology attachment ("ATA") ports 920d, one or more universal serial bus ("USB") ports 920e, and/or the like. In some cases, the one or more ATA ports 920d might each include, without limitation, a serial ATA ("SATA") port, an external SATA ("eSATA") port, a powered eSATA ("eSATAp") port, a mini SATA ("mSATA") port, a SATA Express port, and/or the like. The port controller 920c, in some embodiments, might control the ATA ports 920d and the USB ports 920e, and/or might otherwise serve as an interface between the UNI 910b of the network switch 910 and each of the ATA ports 920d and the USB ports 920e.

System 900 might further comprise one or more client devices 935a-935n (collectively, "client devices 935"), which each communicatively couples to one of the client ports 920. The network port 915a communicatively couples with network 940, receives network traffic from the network 940 to the gateway device 905 (and ultimately to the client device(s) 935), and sends network traffic to the network 940 from the gateway device 905 (and originally from the client device(s) 935).

In some embodiments, each of the one or more computing systems 925a and/or the one or more external computing systems 925b (collectively, "host computing systems 925") might be controlled by one or both of SDN controller(s) 945 and/or one or more NFV entities 950 (denoted by long dash lines 990 connecting the SDN controller(s) 945 with each host computing system 925 and also connecting the one or more NFV entities 950 with each host computing system 925).

In operation, network traffic from the network 940 might be received by transceiver 915 via network port 915a. Transceiver 915 might communicate with the NNI or NNI LAN 910a of the network switch via the routing/NAT device 995 (which might be a virtual routing/NAT component that utilizes VNFs to provide routing/NAT functionality) (as depicted by the bold double-headed solid arrows in FIG. 9). The routing/NAT function/device 995 might communicate with the computing system 925a (as depicted by the bold, double-headed short dash arrow in FIG. 9) to route network traffic from the transceiver to the NNI or NNI LAN 910a of the network switch 925a, through the network switch 910, via the UNI or UNI LAN 910b and via one or more of the plurality of client ports, to corresponding one or more client devices 935 (as depicted by the bold, single-headed dash arrows in FIG. 9). Alternatively or additionally, the network traffic might be routed from the transceiver 915, through the routing/NAT function/device 995, via the NNI or NNI LAN 910a and via host port 930, to the one or more external computing systems 925b, back from the one or more external computing systems 925b to the NNI or NNI LAN 910a, through the network switch 910, via the UNI or UNI LAN 910b and via one or more of the plurality of client ports, to corresponding one or more client devices 935 (as depicted by the bold, single-headed dash arrows in FIG. 9). Although FIG. 9 shows a single direction (particularly, from the transceiver 915 to the computing system 925a to the NNI or NNI LAN 910a), the various embodiments are not so limited, and network traffic may flow uni-directionally from/to the network 940 to/from the client device(s) 935 via the network switch 910 and other components, bi-directionally from/to the network 940 to/from the client device(s) 935 via the network switch 910 and other components, and split-directionally from/to the network 940 to/from the client device(s) 935 via the network switch 910 and other components, and/or the like (as described above with respect to FIG. 8).

According to some embodiments, when a host computing system (or a host port) is added to the gateway device, the host can be handed over to a NFV Orchestrator ("NFVO") or other NFV entity for VNF life cycle management and/or for service management. In such a case, the "network configuration" of the gateway device might not pass to the NFVO or other NFV entity. Only the host is passed to the NFVO or other NFV entity, in which case its configuration may be limited in terms of changing the service path (i.e., NFV forwarding graph flexibility may be limited), resulting in a "host-on-a-stick" configuration.

In FIG. 9, gateway device 905, network switch 910, transceiver 915, client ports 920, computing system(s) 925a, computing system(s) 925b, host port 930, client device(s) 935, network 940, SDN controller(s) 945, NVF entities 950 of system 900 might correspond to (and are otherwise similar, if not identical, to) gateway device 805, network switch 810, transceiver 815, client ports 820, computing system(s) 815a, computing system(s) 815b, host port 830, client device(s) 835, network 840a, 840b, and/or 840c, SDN controller(s) 845, NVF entities 850 or system 800, respectively, and the descriptions of these components of system 800 similarly apply to the corresponding components of system 900. The operation of system 900 is otherwise similar, if not identical, to that of system 800, as described in detail above.

With reference to FIG. 10, system 1000, according to some embodiments, might comprise gateway device 1005, which comprises network switch 1010, transceiver 1015, a plurality of client ports 1020, one or more computing systems 1025*a*, a host port(s) 1030 communicatively coupled to one or more external computing systems 1025*b*, and a routing/network access translation ("NAT") device 1095, and/or the like. The network switch 1010, in some embodiments, might comprise a network-to-network interface ("NNI") or NNI LAN 1010*a*, a user network interface ("UNI") or UNI LAN 1010*b*, and a dynamic host configuration protocol ("DHCP") device 1010*c*. In some cases, the network switch 1010, as well as each of the NNI or NNI LAN 1010*a*, the UNI or UNI LAN 1010*b*, and the DHCP 1010*c*, might be virtual components that utilize VNFs or the like to provide the network switch functionality, as well as the NNI or NNI LAN functionality, the UNI or UNI LAN functionality, and the DHCP functionality.

In some embodiments, the transceiver 1015 might comprise a network port 1015*a*, which (as described above) might provide physical port connections. In some cases, the transceiver 1015 might be a virtual component that utilizes VNFs or the like to provide transceiver functionality. The plurality of client ports, in some instances, might comprise at least one of one or more LAN ports 1020*a*, one or more Wi-Fi ports 1020*b*, one or more port controllers 1020*c*, one or more advanced technology attachment ("ATA") ports 1020*d*, one or more universal serial bus ("USB") ports 1020*e*, and/or the like. In some cases, the one or more ATA ports 1020*d* might each include, without limitation, a serial ATA ("SATA") port, an external SATA ("eSATA") port, a powered eSATA ("eSATAp") port, a mini SATA ("mSATA") port, a SATA Express port, and/or the like. The port controller 1020*c*, in some embodiments, might control the ATA ports 1020*d* and the USB ports 1020*e*, and/or might otherwise serve as an interface between the UNI 1010*b* of the network switch 1010 and each of the ATA ports 1020*d* and the USB ports 1020*e*.

System 1000 might further comprise one or more client devices 1035*a*-1035*n* (collectively, "client devices 1035"), which each communicatively couples to one of the client ports 1020. The network port 1015*a* communicatively couples with network 1040, receives network traffic from the network 1040 to the gateway device 1005 (and ultimately to the client device(s) 1035), and sends network traffic to the network 1040 from the gateway device 1005 (and originally from the client device(s) 1035).

In some embodiments, each of the one or more computing systems 1025*a*, the one or more external computing systems 1025*b* (collectively, "host computing systems 1025"), and/or the network switch 1010 might be controlled by one or both of SDN controller(s) 1045 and/or one or more NFV entities 1050 (denoted by long dash lines 1090 connecting the SDN controller(s) 1045 with each host computing system 1025 and the network switch 1010, and also connecting the one or more NFV entities 1050 with each host computing system 1025 and the network switch 1010).

In operation, network traffic from the network 1040 might be received by transceiver 1015 via network port 1015*a*. Transceiver 1015 might communicate with the NNI or NNI LAN 1010*a* of the network switch via the routing/NAT device 1095 (which might be a virtual routing/NAT component that utilizes VNFs to provide routing/NAT functionality) (as depicted by the bold double-headed solid arrows in FIG. 10). Unlike the routing/NAT function/device 995 of FIG. 9, the routing/NAT function/device 1095 does not directly communicate with the computing system 1025*a*. Rather, the routing/NAT function/device 1095 communicates with the computing system(s) 1025*a* via the NNI or NNI LAN 1010*a* (as depicted by the bold, double-headed short dash arrow in FIG. 10) to route network traffic from the transceiver to the NNI or NNI LAN 1010*a*, to one or both of the one or more computing systems 1025*a* and/or the one or more external computing systems 1025*b* (via host port 1030) (as depicted by the bold, single-headed dash arrows in FIG. 10) through the network switch 1010, via the UNI or UNI LAN 1010*b* and via one or more of the plurality of client ports, to corresponding one or more client devices 1035. Although FIG. 10 shows a single direction (particularly, from the transceiver 1015 to the NNI or NNI LAN 1010*a*), the various embodiments are not so limited, and network traffic may flow uni-directionally from/to the network 1040 to/from the client device(s) 1035 via the network switch 1010 and other components, bi-directionally from/to the network 1040 to/from the client device(s) 1035 via the network switch 1010 and other components, and split-directionally from/to the network 1040 to/from the client device(s) 1035 via the network switch 1010 and other components, and/or the like (as described above with respect to FIG. 8).

According to some embodiments, the system 1000 might provide a platform that is fully flexible and map-able. For example, in some embodiments, a top of rack ("TOR") and/or an end of row ("EOR") switch might be added to the orchestration. In some cases, once the node is "handed over" from the network configuration system to the orchestrator with some default configuration that allows the customer to start up, the NFVO or other NFV entity might take full control of the node to map both the WAN and the LAN side connections to the VNF manager in both serial and parallel connectivity functions, thereby providing full NFV service management.

In FIG. 10, gateway device 1005, network switch 1010, transceiver 1015, client ports 1020, computing system(s) 1025*a*, computing system(s) 1025*b*, host port 1030, client device(s) 1035, network 1040, SDN controller(s) 1045, NVF entities 1050 of system 1000 might correspond to (and are otherwise similar, if not identical, to) gateway device 805, network switch 810, transceiver 815, client ports 820, computing system(s) 815*a*, computing system(s) 815*b*, host port 830, client device(s) 835, network 840*a*, 840*b*, and/or 840*c*, SDN controller(s) 845, NVF entities 850 or system 800, respectively, and the descriptions of these components of system 800 similarly apply to the corresponding components of system 1000. The operation of system 1000 is otherwise similar, if not identical, to that of system 800, as described in detail above.

With reference to FIG. 11, system 1100, according to some embodiments, might comprise gateway device 1105, which comprises network switch 1110, transceiver 1115, a plurality of client ports 1120, one or more computing systems 1125*a*, a host port(s) 1130 communicatively coupled to one or more external computing systems 1125*b*, and/or the like. The network switch 1110, in some embodiments, might comprise a network-to-network interface ("NNI") or NNI LAN 1110*a*, a user network interface ("UNI") or UNI LAN 1110*b*, and a dynamic host configuration protocol ("DHCP") device 1110*c*. In some cases, the network switch 1110, as well as each of the NNI or NNI LAN 1110*a*, the UNI or UNI LAN 1110*b*, and the DHCP 1110*c*, might be virtual components that utilize VNFs or the like to provide the network switch functionality, as well as the NNI or NNI LAN functionality, the UNI or UNI LAN functionality, and the DHCP functionality.

In some embodiments, the transceiver 1115 might comprise a network port 1115a, which (as described above) might provide physical port connections. In some cases, the transceiver 1115 might be a virtual component that utilizes VNFs or the like to provide transceiver functionality. The plurality of client ports, in some instances, might comprise at least one of one or more LAN ports 1120a, one or more Wi-Fi ports 1120b, one or more port controllers 1120c, one or more advanced technology attachment ("ATA") ports 1120d, one or more universal serial bus ("USB") ports 1120e, and/or the like. In some cases, the one or more ATA ports 1120d might each include, without limitation, a serial ATA ("SATA") port, an external SATA ("eSATA") port, a powered eSATA ("eSATAp") port, a mini SATA ("mSATA") port, a SATA Express port, and/or the like. The port controller 1120c, in some embodiments, might control the ATA ports 1120d and the USB ports 1120e, and/or might otherwise serve as an interface between the UNI 1110b of the network switch 1110 and each of the ATA ports 1120d and the USB ports 1120e.

System 1100 might further comprise one or more client devices 1135a-1135n (collectively, "client devices 1135"), which each communicatively couples to one of the client ports 1120. The network port 1115a communicatively couples with network 1140, receives network traffic from the network 1140 to the gateway device 1105 (and ultimately to the client device(s) 1135), and sends network traffic to the network 1140 from the gateway device 1105 (and originally from the client device(s) 1135).

In some embodiments, each of the one or more computing systems 1125a, the one or more external computing systems 1125b (collectively, "host computing systems 1125"), and/or the network switch 1110 might be controlled by one or both of SDN controller(s) 1145 and/or one or more NFV entities 1150 (denoted by long dash lines 1190 connecting the SDN controller(s) 1145 with each host computing system 1125 and the network switch 1110, and also connecting the one or more NFV entities 1150 with each host computing system 1125 and the network switch 1110).

In operation, network traffic from the network 1140 might be received by transceiver 1115 via network port 1115a. In system 1100 of FIG. 11, the routing/NAT function/device 995 and 1095 of systems 900 and 1000, respectively, are incorporated within the network switch 1110 and/or the NNI or NNI LAN 1110a, thereby streamlining network traffic routing. Thus, unlike systems 900 and 1000, transceiver 1115 might communicate with the NNI or NNI LAN 1110a of the network switch directly (as depicted by the bold, solid double-headed arrow in FIG. 11) to route network traffic from the transceiver to the NNI or NNI LAN 1110a, to one or both of the one or more computing systems 1125a and/or the one or more external computing systems 1125b (via host port 1130) (as depicted by the bold, single-headed dash arrows in FIG. 11) through the network switch 1110, via the UNI or UNI LAN 1110b and via one or more of the plurality of client ports, to corresponding one or more client devices 1135. In some cases, the NNI or NNI LAN 1110a might communicate with the computing system(s) 1125a to perform the routing function (as depicted by the bold, double-headed short dash arrow in FIG. 11). Although FIG. 11 shows a single direction (particularly, from the transceiver 1115 to the NNI or NNI LAN 1110a), the various embodiments are not so limited, and network traffic may flow uni-directionally from/to the network 1140 to/from the client device(s) 1135 via the network switch 1110 and other components, bi-directionally from/to the network 1140 to/from the client device(s) 1135 via the network switch 1110 and other components, and split-directionally from/to the network 1140 to/from the client device(s) 1135 via the network switch 1110 and other components, and/or the like (as described above with respect to FIG. 8).

According to some embodiments, as described above, system 1100, as configured, may be used to provide network enhanced gateway functionality, while allowing for flexible implementation, and thus, in some cases, may be implemented by service providers as a "standard" type of node or platform. In some embodiments, SDN controller(s) 1145 and/or the NFV entities 1150 might control the network switch 1110 to route network traffic to/from transceiver 1115 (from network 1140 via network port 1115a), via NNI or NNI LAN 1110a and one or both of the one or more computing systems 1125a and/or the one or more external computing systems 1125b (via host port 1130), to/from at least one of the plurality of client devices 1135 (via UNI or UNI LAN 1110b and via corresponding at least one client port 1120). In some cases, for at least the portion of the network traffic being directed to the client device(s) 1135, based on the characteristics of the at least the portion of the network traffic—including, but not limited to, at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions, and/or the like—, the SDN controller(s) 1145 and/or the NFV entities 1150 might control the host computing system(s) 1125a and/or 1125b to select one or more VNFs, and to send the selected VNFs to the host computing system(s) 1125a and/or 1125b via the network switch 1110, to the particular client device(s) 1135 via the network switch 1110 (and via the UNI or UNI LAN 1110b and the corresponding client port(s) 1120), or both, or to otherwise provide the host computing system(s) 1125a and/or 1125b and/or the particular client device(s) 1135 with access to the selected VNFs. In some instances, the selected VNFs might be selected and sent to the network switch 1110 (or access to the selected VNFs might otherwise be provided to the network switch 1110). The selected VNFs might provide the particular client device(s) 1125 (and/or other component, including, but not limited to, the network switch 1110, the one or more computing systems 1125, the transceiver 1115, the host port 1130, the client port(s) 1120, and/or the like) with one or more functions. In some embodiments, the one or more functions might include, without limitation, at least one of an activation function, an operation function, a deletion function, a specialized function, a firewall function, an Internet of Things ("IoT") proxy function, an application-related function, or an operations, administration, and management ("OAM") function, and/or the like. In some cases, the specialized function might itself be a VNF.

In FIG. 11, gateway device 1105, network switch 1110, transceiver 1115, client ports 1120, computing system(s) 1125a, computing system(s) 1125b, host port 1130, client device(s) 1135, network 1140, SDN controller(s) 1145, NVF entities 1150 of system 1100 might correspond to (and are otherwise similar, if not identical, to) gateway device 805, network switch 810, transceiver 815, client ports 820, computing system(s) 815*a*, computing system(s) 815*b*, host port 830, client device(s) 835, network 840*a*, 840*b*, and/or 840*c*, SDN controller(s) 845, NVF entities 850 or system 800, respectively, and the descriptions of these components of system 800 similarly apply to the corresponding components of system 1100. The operation of system 1100 is otherwise similar, if not identical, to that of system 800, as described in detail above.

Figure 12:
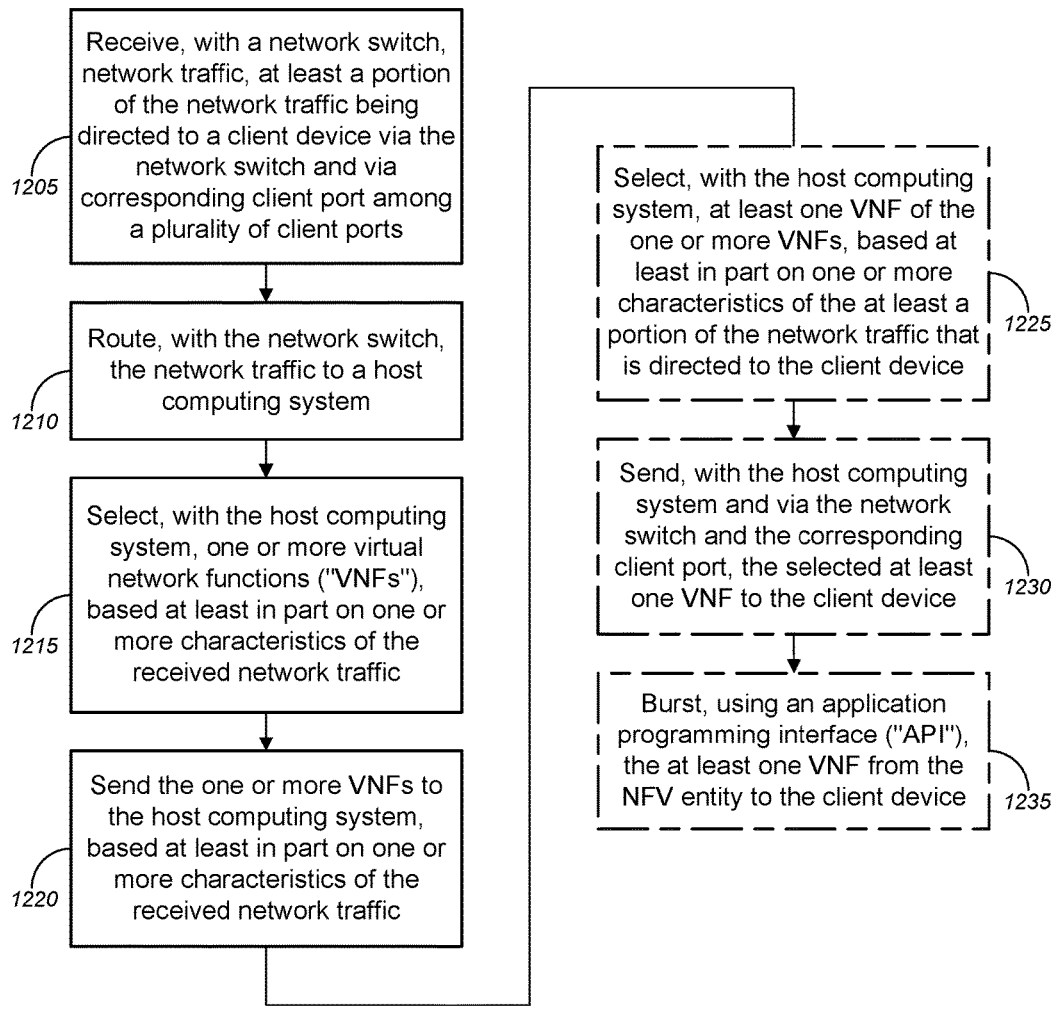
FIG. 12 is a flow diagram illustrating a method for implementing network enhanced gateway functionality, in accordance with various embodiments.

FIG. 12 is a flow diagram illustrating a method 1200 for implementing network enhanced gateway functionality, in accordance with various embodiments. While the techniques and procedures are depicted and/or described in a certain order for purposes of illustration, it should be appreciated that certain procedures may be reordered and/or omitted within the scope of various embodiments. Moreover, while the method 1200 illustrated by FIG. 12 can be implemented by or with (and, in some cases, are described below with respect to) the systems 800, 900, 1000, and 1100 of FIGS. 8, 9, 10, and 11, respectively (or components thereof), such methods may also be implemented using any suitable hardware (or software) implementation. Similarly, while each of the systems 800, 900, 1000, and 1100 of FIGS. 8, 9, 10, and 11, respectively (or components thereof), can operate according to the method 1200 illustrated by FIG. 12 (e.g., by executing instructions embodied on a computer readable medium), the systems 800, 900, 1000, and 1100 of FIGS. 8, 9, 10, and 11 can each also operate according to other modes of operation and/or perform other suitable procedures.

In FIG. 12, method 1200, at block 1205 might comprise receiving, with a network switch (e.g., network switch 810, 910, 1010, and/or 1110 of FIGS. 8-11, or the like), network traffic. At least a portion of the network traffic might be (originally) directed to a client device (e.g., client device 835, 935, 1035, and/or 1135 of FIGS. 8-11, or the like) via the network switch and corresponding client port among a plurality of client ports (e.g., client port 820, 920, 1020, and/or 1120 of FIGS. 8-11, or the like). In some cases, the client device might comprise a user device including, without limitation, one of a tablet computer, a smart phone, a mobile phone, a portable gaming device, a laptop computer, or a desktop computer, and/or the like. Alternatively, the client device might include, but is not limited to, a device selected from a group consisting of a small form factor pluggable ("SFP") device, an enhanced SFP ("SFP+") device, a compact SFP ("CSFP") device, a gigabit interface converter ("GBIC"), and a universal serial bus ("USB") pluggable device, and/or the like. In some cases, at least one of the SFP device, the SFP+ device, or the CSFP device might include, without limitation, at least one of a SFP network interface device ("NID"), a SFP router, a SFP modem, or a SFP wireless access point. The USB pluggable device, in some instances, might include, but is not limited to, one of a printer, a scanner, a combination printer/scanner device, an external hard drive, a camera, a keyboard, a mouse, a drawing interface device, or a mobile device, and/or the like.

In some embodiments, each of the client ports might include, without limitation, one of a local area network ("LAN") port, a Wi-Fi port, an advanced technology attachment ("ATA") port, a serial ATA ("SATA") port, an external SATA ("eSATA") port, a powered eSATA ("eSATAp") port, a mini SATA ("mSATA") port, a SATA Express port, a M.2 port, or a universal serial bus ("USB") port, and/or the like. The network traffic between the network switch and the host computing system, in some embodiments, is at least one of uni-directional network traffic, bi-directional network traffic, or split directional network traffic that originates from at least one of one or more of the plurality of client ports or one or more network ports. In some instances, the network switch is a virtual network switch that utilizes a network switch VNF to provide network switching functionality. In some cases, the network switch might include at least one NNI or NNI LAN and at least one UNI or UNI LAN (e.g., NNI or NNI LAN 910*a*, 1010*a*, and 1110*a* of FIGS. 9-11, respectively, and UNI or UNI LAN 910*b*, 1010*b*, and 1110*b* of FIGS. 9-11, respectively), the NNI or NNI or NNI LAN receiving the network traffic and communicatively coupling with the host computing system, while the UNI or UNI or UNI LAN communicatively coupling with the client device via the corresponding client port of the plurality of client ports.

At block 1210, method 1200 might comprise routing, with the network switch, the network traffic to a host computing system. In some embodiments, the network switch and the host computing system are under control of a network functions virtualization ("NFV") entity, which might include, without limitation, at least one of a NFV orchestrator, a network functions virtualization infrastructure ("NFVI") system, a NFV management and orchestration ("MANO") system, a VNF manager, a NFV resource manager, a virtualized infrastructure manager ("VIM"), a virtual machine ("VM"), a macro orchestrator, or a domain orchestrator, and/or the like. In some cases, the host computing system and the network switch might be disposed within a single gateway device. Alternatively, the host computing system might be located external to a gateway device in which the network switch is disposed, the gateway device comprises a host port, and the host computing system communicatively couples to the network switch via the host port. In other alternative embodiments, one or more first host computing systems might be co-located with the network switch within the single gateway device, while one or more second host computing systems might be located external to the single gateway device and might communicatively couple to the network switch via the host port.

Merely by way of example, the host computing system might include, without limitation, an x86 host computing device, an ARM computing device, or both. In some embodiments, the host computing system might include, but is not limited to, one or more computing cores (preferably, two or more computing cores). In some cases, at least one first computing core might perform functions of a gateway device, while at least one second computing core might perform hypervisor functions to support VNFs.

According to some embodiments, the gateway device, in which the switch is disposed, might be selected from a group consisting of a customer premises equipment ("CPE"), a router, a switch, a network element, a demarcation device, a WiFi gateway device, a hypervisor platform, and one or more virtual machine-based host machines (which might include, without limitation, a kernel-based virtual machine ("KVM")-based host machine, an ESX-based host machine, an ESXi-based host machine, and/or the like), and/or the like. In some cases, the CPE might include, but is not limited to, one of a gateway device comprising at least one of an optical network terminal ("ONT"), a network interface device ("NID"), an enhanced NID ("eNID"), a residential gateway ("RG") device, a business gateway ("BG") device, or a virtual gateway ("vG") device, and/or the like, and the gateway device might be located at or near a customer premises associated with a user of the client device. The NID, in some instances, might be a fiber-fed terminating device, a copper-fed terminating device, or a combination fiber-fed and copper-fed terminating device, and the like. In some embodiments, the gateway device 805 might be an integrated device that terminates the physical layer access line and the gateway (e.g., RG, BG, vG, etc.) in one container or box. In some cases, the gateway device 805 and/or the one or more computing systems 825 might include, without limitation, a VMware Host (which, in some instances, might comprise a bare metal/plastic host or a compute bus on a node, and the like) or a Linux container (as Linux has the ability to create a "virtual host" or soft host as part of the entire NID operating system).

Method 1200 might further comprise, at block 1215, selecting, with the host computing system, one or more virtual network functions ("VNFs"), based at least in part on one or more characteristics of the received network traffic. According to some embodiments, the one or more characteristics of the received network traffic might include, but are not limited to, at least one of one or more attributes of an Ethernet frame, one or more media access control ("MAC") source addresses, one or more MAC destination addresses, one or more Internet Protocol ("IP") source addresses, one or more IP destination addresses, one or more transmission control protocol ("TCP") source ports, one or more TCP destination ports, one or more priority bits, one or more particular bit patterns, bandwidth of a flow, one or more switch ports, one or more ingress ports, one or more Ethernet type identifiers, one or more virtual local area network ("VLAN") identifiers, one or more network protocol identifiers, or one or more action instructions, and/or the like. In some cases, the one or more VNFs might provide the client device (or other component, including, but not limited to, the network switch, the one or more computing systems, the transceiver, the host port, the client port(s), and/or the like) with one or more functions, the one or more functions including, without limitation, at least one of an activation function, an operation function, a deletion function, a specialized function, a firewall function, an Internet of Things ("IoT") proxy function, an application-related function, or an operations, administration, and management ("OAM") function, and/or the like. At block 1220, method 1200 might comprise sending the one or more VNFs to the host computing system, in some cases, based at least in part on the one or more characteristics of the received network traffic.

In some embodiments, selecting the one or more VNFs might comprise selecting, with the host computing system, at least one VNF of the one or more VNFs, based at least in part on one or more characteristics of the at least a portion of the network traffic that is directed to the client device (optional block 1225). At optional block 1230, method 1200 might further comprise sending, with the host computing system and via the network switch and the corresponding client port, the selected at least one VNF to the client device (e.g., a VNF-capable device, including, but not limited to, a set-top box, a local IoT controller, an IoT endpoint, and/or the like). According to some embodiments, sending, with the host computing system and via the network switch and the corresponding client port, the selected at least one VNF to the client device might comprise bursting, using an application programming interface ("API"), the at least one VNF from the NFV entity to the client device (optional block 1235). In some embodiments, sending, with the host computing system and via the network switch and the corresponding client port, the selected at least one VNF to the client device might comprise otherwise providing the client device with access to the selected at least one VNF.

EXEMPLARY SYSTEM AND HARDWARE IMPLEMENTATION

FIG. 13 is a block diagram illustrating an exemplary computer or system hardware architecture, in accordance with various embodiments. FIG. 13 provides a schematic illustration of one embodiment of a computer system 1300 of the service provider system hardware that can perform the methods provided by various other embodiments, as described herein, and/or can perform the functions of computer or hardware system (i.e., gateway devices 110, 205, 310, 805, 905, 1005, and 1105, network interface devices ("NIDs") 115 and 315, programmable services backbone ("PSB") node 130, digital subscriber line access multiplexers ("DSLAMs") or optical line terminals ("OLTs") 135 and 335, software defined network ("SDN") controllers 145, 845, 945, 1045, and 1145, network functions virtualization ("NFV") entities (including, but not limited to, NFV resource manager 850, NFV Infrastructure ("NFVI") system 855, NFV orchestrator 860, NFV management and orchestration ("MANO") architectural framework or system 865, virtual network function ("VNF") manager 870, virtual infrastructure manager ("VIM") 875, other NFV entities 880, NFV entities 150, 950, 1050, and 1150, and/or the like), application service provider ("ASP") servers 155 and 355, service portals 160 and 360, network nodes 225 and 415, edge switches 370, Vp gateway devices 405, Vn gateway devices or containers 410, switches 810, 910, 1010, and 1110, computing systems 825, 925, 1025, and 1125, and client devices 835, 935, 1035, and 1135, etc.), as described above. It should be noted that FIG. 13 is meant only to provide a generalized illustration of various components, of which one or more (or none) of each may be utilized as appropriate. FIG. 13, therefore, broadly illustrates how individual system elements may be implemented in a relatively separated or relatively more integrated manner.

The computer or hardware system 1300—which might represent an embodiment of the computer or hardware system (i.e., gateway devices 110, 205, 310, 805, 905, 1005, and 1105, NIDs 115 and 315, PSB node 130, DSLAMs/OLTs 135 and 335, SDN controllers 145, 845, 945, 1045, and 1145, NFV entities (including, but not limited to, NFV resource manager 850, NFVI system 855, NFV orchestrator 860, NFV MANO architectural framework or system 865, VNF manager 870, VIM 875, other NFV entities 880, NFV entities 150, 950, 1050, and 1150, and/or the like), ASP servers 155 and 355, service portals 160 and 360, network nodes 225 and 415, edge switches 370, Vp gateway devices 405, Vn gateway devices or containers 410, switches 810, 910, 1010, and 1110, computing systems 825, 925, 1025, and 1125, and client devices 835, 935, 1035, and 1135, etc.), described above with respect to FIGS. 8-11—is shown comprising hardware elements that can be electrically coupled via a bus 1305 (or may otherwise be in communication, as appropriate). The hardware elements may include one or more processors 1310, including, without limitation, one or more general-purpose processors and/or one or more special-purpose processors (such as microprocessors, digital signal processing chips, graphics acceleration processors, and/or the like); one or more input devices 1315, which can include, without limitation, a mouse, a keyboard, and/or the like; and one or more output devices 1320, which can include, without limitation, a display device, a printer, and/or the like.

The computer or hardware system 1300 may further include (and/or be in communication with) one or more storage devices 1325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 1300 might also include a communications subsystem 1330, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1330 may permit data to be exchanged with a network (such as the network described below, to name one example), with other computer or hardware systems, and/or with any other devices described herein. In many embodiments, the computer or hardware system 1300 will further comprise a working memory 1335, which can include a RAM or ROM device, as described above.

The computer or hardware system 1300 also may comprise software elements, shown as being currently located within the working memory 1335, including an operating system 1340, device drivers, executable libraries, and/or other code, such as one or more application programs 1345, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1325 described above. In some cases, the storage medium might be incorporated within a computer system, such as the system 1300. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 1300 and/or might take the form of source and/or installable code, which, upon compilation and/or installation on the computer or hardware system 1300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1300) to perform methods in accordance with various embodiments of the invention. According to a set of embodiments, some or all of the procedures of such methods are performed by the computer or hardware system 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer readable medium, such as one or more of the storage device(s) 1325. Merely by way of example, execution of the sequences of instructions contained in the working memory 1335 might cause the processor(s) 1310 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1300, various computer readable media might be involved in providing instructions/code to processor(s) 1310 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 1325. Volatile media includes, without limitation, dynamic memory, such as the working memory 1335. In some alternative embodiments, a computer readable medium may take the form of transmission media, which includes, without limitation, coaxial cables, copper wire and fiber optics, including the wires that comprise the bus 1305, as well as the various components of the communication subsystem 1330 (and/or the media by which the communications subsystem 1330 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1310 for execution. Merely by way of example, the instructions may initially be carried on a magnetic disk and/or optical disc of a remote computer.

A remote computer might load the instructions into its dynamic memory and send the instructions as signals over a transmission medium to be received and/or executed by the computer or hardware system 1300. These signals, which might be in the form of electromagnetic signals, acoustic signals, optical signals, and/or the like, are all examples of carrier waves on which instructions can be encoded, in accordance with various embodiments of the invention.

The communications subsystem 1330 (and/or components thereof) generally will receive the signals, and the bus 1305 then might carry the signals (and/or the data, instructions, etc. carried by the signals) to the working memory 1335, from which the processor(s) 1305 retrieves and executes the instructions. The instructions received by the working memory 1335 may optionally be stored on a storage device 1325 either before or after execution by the processor(s) 1310.

As noted above, a set of embodiments comprises methods and systems for implementing extension of customer local area networks ("LANs"), implementing isolated service overlays over a network, and/or implementing network enhanced gateway functionality, and, in particular embodiments, to methods, systems, apparatus, and computer software for implementing extension of customer LANs at a provider network service point(s), implementing isolated service overlays between the provider network service point(s) and each of one or more customer premises, and/or implementing network enhanced gateway functionality using network functions virtualization ("NFV") and/or software defined networks ("SDNs"). FIG. 14 illustrates a schematic diagram of a system 1400 that can be used in accordance with one set of embodiments. The system 1400 can include one or more user computers, user devices, or customer devices 1405. A user computer, user device, or customer device 1405 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1405 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1405 can be any other electronic device, such as a thin-client computer, Internet-enabled mobile telephone, and/or personal digital assistant, capable of communicating via a network (e.g., the network(s) 1410 described below) and/or of displaying and navigating web pages or other types of electronic documents. Although the exemplary system 1400 is shown with two user computers, user devices, or customer devices 1405, any number of user computers, user devices, or customer devices can be supported.

Certain embodiments operate in a networked environment, which can include a network(s) 1410. The network(s) 1410 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1410 (similar to network 840a, 840b, and/or 840c, 940, 1040, or 1140 of FIGS. 8-11, respectively, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1415. Each of the server computers 1415 may be configured with an operating system, including, without limitation, any of those discussed above, as well as any commercially (or freely) available server operating systems. Each of the servers 1415 may also be running one or more applications, which can be configured to provide services to one or more clients 1405 and/or other servers 1415.

Merely by way of example, one of the servers 1415 might be a data server, a web server, a cloud computing device(s), or the like, as described above. The data server might include (or be in communication with) a web server, which can be used, merely by way of example, to process requests for web pages or other electronic documents from user computers 1405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1405 to perform methods of the invention.

The server computers 1415, in some embodiments, might include one or more application servers, which can be configured with one or more applications accessible by a client running on one or more of the client computers 1405 and/or other servers 1415. Merely by way of example, the server(s) 1415 can be one or more general purpose computers capable of executing programs or scripts in response to the user computers 1405 and/or other servers 1415, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1405 and/or another server 1415. In some embodiments, an application server can perform one or more of the processes for implementing extension of customer LANs, implementing isolated service overlays over a network, and/or implementing network enhanced gateway functions, and, in particular embodiments, to methods, systems, apparatus, and computer software for implementing extension of customer LANs at a provider network service point(s), implementing isolated service overlays between the provider network service point(s) and each of one or more customer premises, and/or implementing network enhanced gateway functionality using NFV and/or SDNs, or the like, as described in detail above. Data provided by an application server may be formatted as one or more web pages (comprising HTML, JavaScript, etc., for example) and/or may be forwarded to a user computer 1405 via a web server (as described above, for example). Similarly, a web server might receive web page requests and/or input data from a user computer 1405 and/or forward the web page requests and/or input data to an application server. In some cases, a web server may be integrated with an application server.

In accordance with further embodiments, one or more servers 1415 can function as a file server and/or can include one or more of the files (e.g., application code, data files, etc.) necessary to implement various disclosed methods, incorporated by an application running on a user computer 1405 and/or another server 1415. Alternatively, as those skilled in the art will appreciate, a file server can include all necessary files, allowing such an application to be invoked remotely by a user computer, user device, or customer device 1405 and/or server 1415.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1420a and 1420b (collectively, "databases 1420"). The location of each of the databases 1420 is discretionary: merely by way of example, a database 1420a might reside on a storage medium local to (and/or resident in) a server 1415a (and/or a user computer, user device, or customer device 1405). Alternatively, a database 1420b can be remote from any or all of the computers 1405, 1415, so long as it can be in communication (e.g., via the network 1410) with one or more of these. In a particular set of embodiments, a database 1420 can reside in a storage-area network ("SAN") familiar to those skilled in the art. (Likewise, any necessary files for performing the functions attributed to the computers 1405, 1415 can be stored locally on the respective computer and/or remotely, as appropriate.) In one set of embodiments, the database 1420 can be a relational database, such as an Oracle database, that is adapted to store, update, and retrieve data in response to SQL-formatted commands. The database might be controlled and/or maintained by a database server, as described above, for example.

According to some embodiments, system 1400 might further comprise a gateway device 1425 (similar to gateway device 805, 905, 1005, or 1105 of FIGS. 8-11, respectively, or the like). Gateway device 1425 might comprise a switch 1430 (similar to switch 810, 910, 1010, or 1110 of FIGS. 8-11, respectively, or the like) and a computing system 1435 (similar to computing system 825, 925, 1025, or 1125 of FIGS. 8-11, respectively, or the like). Although FIG. 14 shows computing system 1435 embodied within gateway device 1425, the various embodiments are not so limited, and computing system 1435 may be embodied external to the gateway device 1425, while being communicatively coupled to the gateway device 1425 via a host port (not shown; similar to host port 830, 930, 1030, or 1130 of FIGS. 8-11, respectively, or the like). System 1400 might further comprise one or more NFV entities 1440 and/or one or more SDN controllers 1440. In some cases, the one or more NFV entities 1440 might include, without limitation, one or more of a NFV resource manager (e.g., NFV resource manage 850 of FIG. 8, or the like), a NFVI system (e.g., NFVI system 855 of FIG. 8, or the like), a NFV orchestrator (e.g., NFV orchestrator 860 of FIG. 8, or the like), a NFV MANO architectural framework or system (e.g., NFV MANO architectural framework or system 865 of FIG. 8, or the like), a VNF manager (e.g., VNF manager 870 of FIG. 8, or the like), a VIM (e.g., VIM 875 of FIG. 8, or the like), other NFV entities (e.g., other NFV entities 880 of FIG. 8, or the like), a NFV entity (e.g., NFV entities 950, 1050, and 1150 of FIGS. 9-11, or the like), and/or the like). The one or more NFV entities and/or SDN controllers 1440 might communicatively couple with, and control, at least one of switch 1430 and/or computing system 1435, as described in detail above with respect to the embodiments of FIGS. 8-11.

In some embodiments, system 1400 might further comprise a network node 1445 (e.g., network node 225a of FIG. 2B, network node 225b of FIG. 2C, network node 415 of FIG. 4, and/or the like), which might comprise a gateway device 1450 (e.g., Vn gateway device 410a-410n of FIG. 4, Vn gateway container 410 of FIG. 5, and/or the like). The network node 1445 might enable establishment of a connection between a service provider network and a customer LAN and might extend the customer LAN (via the connection) to span between the network service point and the customer premises, and/or the like, as described in detail above with respect to FIGS. 1, 2, and 6. The gateway device 1450 might, according to some embodiments, enable establishment of two or more isolated service overlays—which might include, without limitation, two or more of a secure data service overlay, an Internet service overlay, an Internet of Things ("IoT") service overlay, a PSB service overlay, a content delivery network ("CDN") service overlay, one or more application or app service overlays each associated with an application service provider, or one or more other service overlays each associated with a service provider, and/or the like—across the customer LAN between the network service point and the customer premises, as described in detail above with respect to FIGS. 1, 4, 5, and 7. The gateway device 1450 might also enable mapping between the service provider network and the customer LAN (in some cases, mapping between the service provider network and the customer LAN for each of the two or more service overlays), as described above with respect to FIGS. 6 and 7.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    establishing, at a network service point in a service provider network, a connection between the service provider network and a customer local area network ("LAN"), the customer LAN being established within a customer premises of a plurality of customer premises; and
    establishing two or more isolated service overlays across the connection between the network service point and the customer premises, each of the two or more isolated service overlays having network traffic that is isolated from network traffic transmitted along another of the two or more isolated service overlays.

2. The method of claim 1, wherein the two or more isolated service overlays comprise two or more of a secure data service overlay, an Internet service overlay, an Internet of Things ("IoT") service overlay, a programmable services backbone ("PSB") service overlay, a content delivery network ("CDN") service overlay, one or more application service overlays each associated with an application service provider, or one or more other service overlays each associated with a service provider.

3. The method of claim 1, wherein establishing the two or more isolated service overlays across the customer LAN between the network service point and the customer premises comprises establishing one of a virtual LAN ("VLAN") or a virtual extensible LAN ("VXLAN") for each of the two or more isolated service overlays across the customer LAN between the network service point and the customer premises.

4. The method of claim 1, wherein the network service point is located at one of an edge switch, a central office, or a digital subscriber line access multiplexer ("DSLAM").

5. The method of claim 1, wherein the network service point is located at one of an optical line terminal ("OLT"), a network access point ("NAP"), a network interface device ("NID"), or an enhanced NID ("eNID"), each of which is located near or within the customer premises.

6. The method of claim 1, wherein establishing the connection between the service provider network and the customer LAN comprises one of establishing a wireless connection between the service provider network and the customer LAN, establishing a wired connection between the service provider network and the customer LAN, establishing a hybrid wireless/wired connection between the service provider network and the customer LAN, or establishing a backup connection between the service provider network and the customer LAN.

7. The method of claim 1, further comprising:
    mapping between the service provider network and the customer LAN for each of the two or more isolated service overlays.

8. The method of claim 7, wherein mapping between the service provider network and the customer LAN for each of the two or more isolated service overlays comprises mapping between the service provider network and the customer LAN for each of the two or more isolated service overlays, via at least one of a router function, a mapper function, a programmable services backbone ("PSB") function, a network functions virtualization ("NFV") function, or a software-defined network ("SDN") function.

9. The method of claim 1, further comprising:
    selectively placing at least one of a firewall, an application, or content in any one or more of the two or more isolated service overlays, without affecting network traffic or network service along any other of the two or more isolated service overlays.

10. A system, comprising:
    a gateway device located at a customer premises of a plurality of customer premises, the gateway device comprising:
        at least one first processor; and
        a first non-transitory computer readable medium communicatively coupled to the at least one first processor, the first non-transitory computer readable medium having stored thereon computer software comprising a first set of instructions that, when executed by the at least one first processor, causes the gateway device to:
            establish a customer local area network ("LAN") within the customer premises; and
    a network node located at a network service point in a service provider network, the network node comprising:
        at least one second processor; and
        a second non-transitory computer readable medium communicatively coupled to the at least one second processor, the second non-transitory computer readable medium having stored thereon computer software comprising a second set of instructions that, when executed by the at least one second processor, causes the network node to:
            establish, at the network service point, a connection between the service provider network and the customer LAN; and
            establish two or more isolated service overlays across the connection between the network service point and the customer premises, each of the two or more isolated service overlays having network traffic that is isolated from network traffic transmitted along another of the two or more isolated service overlays.

11. The system of claim 10, wherein the two or more isolated service overlays comprise two or more of a secure data service overlay, an Internet service overlay, an Internet of Things ("IoT") service overlay, a programmable services backbone ("PSB") service overlay, a content delivery network ("CDN") service overlay, one or more application service overlays each associated with an application service provider, or one or more other service overlays each associated with a service provider.

12. The system of claim 10, wherein establishing the two or more isolated service overlays across the customer LAN between the network service point and the customer premises comprises establishing one of a virtual LAN ("VLAN") or a virtual extensible LAN ("VXLAN") for each of the two or more isolated service overlays across the customer LAN between the network service point and the customer premises.

13. The system of claim 10, wherein the network service point is located at one of an edge switch, a central office, or a digital subscriber line access multiplexer ("DSLAM").

14. The system of claim 10, wherein the network service point is located at one of an optical line terminal ("OLT"), a network access point ("NAP"), a network interface device ("NID"), or an enhanced NID ("eNID"), each of which is located near or within the customer premises.

15. The system of claim 10, wherein establishing the connection between the service provider network and the customer LAN comprises one of establishing a wireless connection between the service provider network and the customer LAN, establishing a wired connection between the service provider network and the customer LAN, establishing a hybrid wireless/wired connection between the service provider network and the customer LAN, or establishing a backup connection between the service provider network and the customer LAN.

16. The system of claim 10, wherein the second set of instructions, when executed by the at least one second processor, further causes the network node to:
map between the service provider network and the customer LAN for each of the two or more isolated service overlays.

17. The system of claim 16, wherein mapping between the service provider network and the customer LAN for each of the two or more isolated service overlays comprises mapping between the service provider network and the customer LAN for each of the two or more isolated service overlays, via at least one of a router function, a mapper function, a programmable services backbone ("PSB") function, a network functions virtualization ("NFV") function, or a software-defined network ("SDN") function.

18. The system of claim 10, wherein the second set of instructions, when executed by the at least one second processor, further causes the network node to:
selectively place at least one of a firewall, an application, or content in any one or more of the two or more isolated service overlays, without affecting network traffic or network service along any other of the two or more isolated service overlays.

19. An apparatus located at a network service point in a service provider network, the apparatus comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
establish, at the network service point, a connection between the service provider network and a customer local area network ("LAN"), the customer LAN being established within a customer premises of a plurality of customer premises; and
establish two or more isolated service overlays across the connection between the network service point and the customer premises, each of the two or more isolated service overlays having network traffic that is isolated from network traffic transmitted along another of the two or more isolated service overlays.

20. The apparatus of claim 19, wherein the two or more isolated service overlays comprise two or more of a secure data service overlay, an Internet service overlay, an Internet of Things ("IoT") service overlay, a programmable services backbone ("PSB") service overlay, a content delivery network ("CDN") service overlay, one or more application service overlays each associated with an application service provider, or one or more other service overlays each associated with a service provider.

21. The apparatus of claim 19, wherein establishing the two or more isolated service overlays across the customer LAN between the network service point and the customer premises comprises establishing one of a virtual LAN ("VLAN") or a virtual extensible LAN ("VXLAN") for each of the two or more isolated service overlays across the customer LAN between the network service point and the customer premises.

22. The apparatus of claim 19, wherein the network service point is located at one of an edge switch, a central office, or a digital subscriber line access multiplexer ("DSLAM").

23. The apparatus of claim 19, wherein the set of instructions, when executed by the at least one processor, further causes the apparatus to:
map between the service provider network and the customer LAN for each of the two or more isolated service overlays, via at least one of a router function, a mapper function, a programmable services backbone ("PSB") function, a network functions virtualization ("NFV") function, or a software-defined network ("SDN") function.

24. The apparatus of claim 19, wherein the set of instructions, when executed by the at least one processor, further causes the apparatus to:
selectively place at least one of a firewall, an application, or content in any one or more of the two or more isolated service overlays, without affecting network traffic or network service along any other of the two or more isolated service overlays.

\* \* \* \* \*